United States Patent
Sankaran et al.

(10) Patent No.: US 11,548,233 B2
(45) Date of Patent: Jan. 10, 2023

(54) METHOD OF ANCHORING A CONNECTOR ELEMENT, A MACHINE FOR CARRYING OUT THE METHOD AND A CONNECTOR ELEMENT ANCHORING KIT

(71) Applicants: IKEA Supply AG, Pratteln (CH); WoodWelding SA

(72) Inventors: Muthumariappan Sankaran, Älmhult (SE); Mario Lehmann, Les Pommerats (CH); Laurent Torriani, Lamboing (CH)

(73) Assignees: IKEA SUPPLY AG, Pratteln (CH); WOODWELDING SA, Stansstad NW (CH)

( * ) Notice: Subject to any disclaimer, the term of this patent is extended or adjusted under 35 U.S.C. 154(b) by 585 days.

(21) Appl. No.: 16/478,062

(22) PCT Filed: Jan. 19, 2018

(86) PCT No.: PCT/SE2018/050042
§ 371 (c)(1),
(2) Date: Jul. 15, 2019

(87) PCT Pub. No.: WO2018/135996
PCT Pub. Date: Jul. 26, 2018

(65) Prior Publication Data
US 2019/0358908 A1    Nov. 28, 2019

(30) Foreign Application Priority Data

Jan. 19, 2017   (SE) .................................... 1750047-1

(51) Int. Cl.
B32B 41/00    (2006.01)
B29C 65/08    (2006.01)
(Continued)

(52) U.S. Cl.
CPC ............ B29C 65/08 (2013.01); B29C 65/602 (2013.01); B29C 65/603 (2013.01);
(Continued)

(58) Field of Classification Search
CPC ..... B29C 65/08; B29C 65/602; B29C 65/603; B29C 65/607; B29C 65/608;
(Continued)

(56) References Cited

U.S. PATENT DOCUMENTS

| | | | |
|---|---|---|---|
| 2011/0296788 A1* | 12/2011 | Cove ..................... | B29C 66/112 52/704 |
| 2014/0044476 A1 | 2/2014 | Cove et al. | |
| 2016/0001394 A1 | 1/2016 | Stumpf | |

FOREIGN PATENT DOCUMENTS

| | | |
|---|---|---|
| CN | 101535661 A | 9/2009 |
| CN | 102256766 A1 | 11/2011 |

(Continued)

OTHER PUBLICATIONS

Chinese Office Action for CN Application No. 201880007392.0 dated Sep. 18, 2020 (8 pages), English Translation.
(Continued)

*Primary Examiner* — Michael N Orlando
*Assistant Examiner* — Joshel Rivera
(74) *Attorney, Agent, or Firm* — Merchant & Gould P.C.

(57) ABSTRACT

A method of anchoring a connector element (10) in a receiving object (66) comprises inserting a distal end of the connector element (10) into a mounting hole in an insertion direction along an insertion axis; inserting a sleeve (36) comprising a thermoplastic material into the mounting hole, the sleeve (36) enclosing the connector element (10); and transferring energy to liquefy at least a portion of the thermoplastic material of the sleeve (36). A machine (500) configured for carrying out the method and a connector
(Continued)

element anchoring kit comprising a connector element (10) and a sleeve (36) comprising thermoplastic material.

16 Claims, 17 Drawing Sheets

(51) Int. Cl.
    *B29C 65/60*         (2006.01)
    *B29C 65/64*         (2006.01)
    *B29C 65/00*         (2006.01)
    *F16B 37/12*         (2006.01)
    *B29L 1/00*          (2006.01)

(52) U.S. Cl.
    CPC .......... *B29C 65/607* (2013.01); *B29C 65/608* (2013.01); *B29C 65/645* (2013.01); *B29C 66/30321* (2013.01); *B29C 66/30326* (2013.01); *B29C 66/474* (2013.01); *B29C 66/71* (2013.01); *B29C 66/727* (2013.01); *B29C 66/7392* (2013.01); *B29C 66/8322* (2013.01); *B29C 66/9513* (2013.01); *B29C 66/9517* (2013.01); *F16B 37/122* (2013.01); *B29L 2001/005* (2013.01)

(58) Field of Classification Search
    CPC ........... B29C 65/645; B29C 66/30321; B29C 66/30326; B29C 66/474; B29C 66/71; B29C 66/727; B29C 66/7392; B29C 66/8322; F16B 37/122
    USPC ................... 156/60, 64, 350, 351, 378, 379
See application file for complete search history.

(56) References Cited

FOREIGN PATENT DOCUMENTS

| | | |
|---|---|---|
| CN | 105395246 A | 3/2016 |
| DE | 10 2013 206 576 A1 | 10/2014 |
| EP | 2202050 A1 | 6/2010 |
| FR | 2485119 A3 | 12/1981 |
| JP | S46-005808 | 12/1971 |
| WO | 03/046390 A2 | 6/2003 |
| WO | WO 2008/080238 A1 | 7/2008 |
| WO | WO 2009/052644 A1 | 4/2009 |
| WO | WO 2010/072009 A1 | 7/2010 |
| WO | WO 2015/181300 A1 | 12/2015 |
| WO | WO-2016165036 A1 * 10/2016 ............. B29C 65/08 |

OTHER PUBLICATIONS

Extended European Search Report for EP Application No. 18741217.6 dated Oct. 2, 2020 (11 pages).
International Search Report and Written Opinion for PCT/SE2018/050042, dated Apr. 20, 2018.
Japanese Office Action for JP Application No. 2019-539279 dated Nov. 3, 2021 (11 pages, with English translation).

* cited by examiner

METHOD OF ANCHORING A CONNECTOR ELEMENT, A MACHINE FOR CARRYING OUT THE METHOD AND A CONNECTOR ELEMENT ANCHORING KIT

This application is a National Stage Application of PCT/SE2018/050042, filed 19 Jan. 2018, which claims the benefit of priority to Swedish Patent Application No. 1750047-1, filed 19 Jan. 2017, which applications are incorporated herein by reference. To the extent appropriate, a claim of priority is made to each of the above disclosed applications.

FIELD OF THE INVENTION

The present invention relates to a method of anchoring a connector element in a receiving object. The invention also relates to a machine for carrying out the method, and to a connector element anchoring kit.

BACKGROUND OF THE INVENTION

Screws are commonly used for connecting objects. Sometimes, one of the objects to be connected has a hole provided with an internal thread for receiving a screw. The thread may be machined directly in the body material of the object. In other situations, the body material of the object may, for various reasons, be less suited for machining a thread directly therein. For the purpose, a plethora of methods of anchoring a threaded metal insert in an object are known in the art. By way of example, FR2485119 discloses a method of anchoring a threaded insert in a chipboard. The threaded insert is inserted in a compressed state into a pre-drilled hole, and expanded into firm engagement with the chipboard when a screw is screwed into the threaded insert. In the design of such inserts, there is a trade-off between on one hand the strength of the engagement between the threaded insert and the object in which it is anchored, and on the other hand the risk of causing damage to the material of the object in which it is anchored, thereby weakening the area in which the threaded insert is anchored. Either way, the strength of the joint may be compromised.

SUMMARY OF THE INVENTION

It is an object of the present invention to solve, or at least mitigate, parts or all of the above-mentioned problems. To this end, there is provided a method of anchoring a connector element in a receiving object, the receiving object having an anchoring region provided with a mounting hole for receiving the connector element, and the connector element having a distal end and a proximal end, the proximal end being provided with a first connector interface for engaging with a mating second connector interface of another object, the method comprising inserting the distal end of the connector element into the mounting hole in an insertion direction along an insertion axis; inserting a sleeve comprising a thermoplastic material into the mounting hole, the sleeve enclosing the connector element; and transferring energy to liquefy at least a portion of the thermoplastic material of the sleeve. Such a method provides for a strong engagement between the connector element and the receiving object without exposing the material of the receiving object to e.g. delamination or fissures.

According to an embodiment, the sleeve and the connector element may be pre-assembled and inserted into said mounting hole simultaneously. Alternatively, the sleeve and the connector element may be inserted one after the other. By way of example, the connector element may be inserted before the sleeve. However, inserting the sleeve and the connector element as an assembly may provide for a simpler anchoring process, since it will not be necessary to maintain the position of e.g. the connector element in the mounting hole while inserting the sleeve. It also facilitates having an insertion direction which is not directed vertically downwards, since the sleeve may have a close fit in the mounting hole.

According to an embodiment, the sleeve is unbonded to the connector element. Thereby, as different parts of the sleeve liquefy, the non-liquefied parts of the sleeve may be allowed to axially move along the connector element, while permitting the connector element to remain stationary. This facilitates obtaining a well-defined final position of the connector element.

According to an embodiment, the energy may be transferred by means of mechanical energy transfer, and preferably mechanical vibration. Mechanical vibration may generate friction heat where the sleeve interfaces the connector element and/or the receiving object. The mechanical vibration may be induced by a source of ultrasonic vibration in contact with e.g. the sleeve. According to an embodiment, the source of ultrasonic vibration may be held out of contact with the connector element throughout the entire anchoring process. By pressing the sleeve axially into the mounting hole during vibration, liquefaction may be initiated at regions where the sleeve axially abuts the connector element and/or the receiving object.

According to an embodiment, the liquefaction of the thermoplastic material may be initiated at a liquefaction initiation interface between the sleeve and the connector element. Thereby, the location where the liquefaction will start will be well defined by the design and tolerances of the sleeve and connector element, resulting in an accurate and reproducible anchoring process. Moreover, the risk of damaging the material of the anchoring region is minimized, since no pressure and/or frictional load needs to be applied between the sleeve and the anchoring region. The liquefaction may be initiated at said liquefaction initiation interface by applying an axial force between the sleeve and the connector element, and moving the sleeve relative to the connector element to generate friction heat. According to an embodiment, said liquefaction initiation interface may be located at a distal end of the sleeve. Thereby, a deep anchoring of the connector element is warranted. The liquefaction initiation interface may be formed by the interface between the axial end of the sleeve and a distal end collar of the connector element extending radially, with respect to the insertion axis, from a body portion of the connector element.

According to an embodiment, the energy may be transferred to sequentially liquefy a plurality of axially separate portions of the thermoplastic material of the sleeve. By liquefying the axially separate portions sequentially, the liquefaction energy may be consecutively concentrated to each axially separate portion. Thereby, liquefaction may be obtained along a substantial portion of the axial length of the connector element, with only a moderate transfer of liquefaction energy to the sleeve. This may be particularly useful in combination with an anchoring region or a connector element of a thermally highly conductive material, such as metal, since the high thermal conductivity may otherwise limit the flow range of the liquefied material along the interface between the inner wall of the mounting hole and the connector element before it re-solidifies. The axially separate portions of the thermoplastic material of the sleeve may be liquefied in a consecutive order from the distal end to the proximal end. The axially separate portions of the thermoplastic material of the sleeve may be sequentially liquefied by sequentially engaging with respective different portions of the connector element, such as shoulders and/or radial collars, and/or shoulders of the mounting hole wall.

According to an embodiment, the distal end of the connector element may be moved into an axial end position, in which it abuts an axial support face of the mounting hole, prior to liquefying said at least a portion of the thermoplastic material. Thereby, the connector element may be held stationary against the axial support face throughout the entire anchoring process, allowing its final position to be accurate and well defined. The axial support face may be formed by a shoulder on an inner wall of the mounting hole, or, if the mounting hole is a blind hole, by the bottom of the mounting hole.

According to an embodiment, the anchoring region may comprise a solid material which is penetrable by the thermoplastic material of the sleeve when liquefied, and the method may further comprise allowing at least a portion of the liquefied thermoplastic material to penetrate into the penetrable material. The penetrable material may be a fibrous and/or porous material, such as a structural foam or a board material based on plants, e.g. chipboard or wood, or a porous ceramic material.

According to an embodiment, the method may further comprise allowing at least a portion of the liquefied thermoplastic material to axially enclose a structure extending radially from a body of the connector element, and thereafter allowing the liquefied thermoplastic material to solidify to provide axial support between the connector element and the anchoring region. The radially extending structure may, by way of example, comprise a collar enclosing, and extending radially from, a body portion of the connector element.

According to an embodiment, the method may further comprise allowing at least a portion of the liquefied thermoplastic material to enclose a tangentially varying surface structure of the connector element, and thereafter allowing the liquefied thermoplastic material to solidify to provide rotation resistance to the engagement between the connector element and the anchoring region. The tangentially varying structure may, by way of example, comprise ridges on a radial collar, the ridges extending in the radial and/or axial direction.

According to an embodiment, the receiving object may be a furniture part, or a blank for forming a furniture part.

According to an embodiment, the first connector interface may be a female connector interface for engaging with a male connector interface. Such a female connector interface may be completely countersunk into the receiving object, to provide a receiving object surface free from any protruding elements. The female connector interface may have an internal thread for receiving a screw having a mating, outer thread. Such a screw may be attached to e.g. a furniture leg or an adjustable furniture foot. Alternatively, the first connector interface may be a male connector interface for engaging with a female connector interface. The male connector interface may have an outer thread for engaging with an inner thread of e.g. a nut.

According to an embodiment, the method may further comprise moving a proximal end of the sleeve in the insertion direction while said at least a portion of the sleeve is liquefied. This may press liquefied thermoplastic into any spaces or pores in the anchoring region of the receiving object, thereby increasing the strength of the engagement.

According to an embodiment, the connector element may be inserted into the mounting hole to a position in which it is flush with, or countersunk into, an outer surface of the receiving object. Also the sleeve may, alternatively or additionally, be moved to a position in which a proximal end of the sleeve is flush with, or countersunk into, said outer surface of the receiving object. This may reduce the risk that any respective protruding parts interfere with or get squeezed below an object to be attached to the receiving object via said first and second connector interfaces.

According to another aspect of the invention, parts or all of the above mentioned problems are solved, or at least mitigated, by a connector element anchoring kit comprising a connector element configured to be anchored in a receiving object, the connector element having a relatively non-thermoplastic body with a distal end for inserting into a mounting hole of the receiving object in an insertion direction along an insertion axis, and a proximal end provided with a first connector interface for engaging with a mating second connector interface, the connector element anchoring kit further comprising a sleeve comprising a thermoplastic material, the sleeve having a distal end and a proximal end, and being configured to receive and enclose the connector element. Using such a kit, a connector element may be bonded into position in the mounting hole, for example following any of the methods described hereinabove. This provides for a strong engagement without exposing the material of the receiving object to e.g. delamination or fissures.

According to an embodiment, the sleeve may comprise a plurality of axially separated shoulder portions configured to engage with a plurality of axially separated support faces of the connector element and/or the receiving object, to liquefy the sleeve at a plurality of axially separate melting regions. Thereby, the connector element may be anchored at several axial locations. Said shoulder portions of the sleeve may be located at axial positions preventing them from simultaneously engaging with the respective support faces of the connector element and/or the receiving object, such that one melting region can only engage after the shoulder portion of another melting region has liquefied. The shoulder portions may be axially arranged so as to liquefy in a consecutive order, e.g. starting from the distal end of the sleeve.

According to an embodiment, the connector element may, at its distal end, have a distal end collar extending radially, with respect to the insertion axis, from the body, and the sleeve may, at its distal end, have an inner cross-section which is smaller than the cross-section of the distal end collar, wherein the connector element is insertable into the sleeve to a bonding start position in which the distal end collar axially engages with the distal end of the sleeve. The distal end collar may form an anvil for the sleeve, thereby inducing melting of the collar at the distal end of the connector element, which may be located at the bottom of the mounting hole. The collar may form a continuous or interrupted ridge enclosing the body. The ridge may follow a plane perpendicular to the insertion direction. The distal end collar will, together with re-solidified thermoplastic material, form a bond having a high axial strength between the connector element and the anchoring region, and particularly against pulling the connector element in a direction opposite to the insertion direction.

According to an embodiment, the distal end collar may have a proximal face which, as it extends in the radial direction, slopes towards the insertion direction. Such a shape may increase the friction in the engagement between sleeve and connector element, and may also assist in pressing liquefied thermoplastics towards the inner walls of the mounting hole. According to an embodiment, the distal end collar may have a proximal face provided with a surface structure increasing the friction against the distal end of the sleeve. The surface structure may also provide torque strength to the engagement between the receiving object and the connector element. By way of example, the surface structure may be configured as ridges extending in the radial direction. According to an embodiment, the distal end collar may also be perforated to increase the flow of liquefied thermoplastic material to the distal side of the distal end collar.

According to an embodiment, the sleeve may be configured to enclose the connector element with a radially loose fit at least at all axial positions except the distal end. This reduces the risk that the sleeve will start melting at other axial positions than at the distal end. The term "radially loose fit" is to be construed as not being friction fit—it does not imply the presence of a gap. According to an embodiment, also the distal end of the sleeve may have a radially loose fit. According to another embodiment, the sleeve may be configured to engage with the connector element with a tight friction fit at the distal end. Thereby, the liquefaction may be initiated at the distal end without the use of a distal end collar of the connecting element serving as anvil for the sleeve. The sleeve may be unbonded to the connector element.

According to an embodiment, the connector element may comprise at least one intermediate collar, located in an intermediate region between the proximal and distal ends and extending radially, with respect to the insertion axis, from the body, and the sleeve may comprise an inwards facing circumferential slot for receiving the intermediate collar. The intermediate collar may increase the axial strength of the anchored engagement between the connector element and the receiving object, and in particular, against pushing the connector element in the insertion direction. This may be of particular value if the mounting hole is a through hole, or if the mounting hole extends almost all the way through the receiving object, leaving only a thin, weak bottom wall. Thereby, substantial material savings can be made, since the thickness of the receiving object can kept low with maintained axial strength of the anchoring in the insertion direction. According to an embodiment, the connector element is insertable into the sleeve to be held at a bonding start position in which the intermediate collar is received in the circumferential slot, and the intermediate collar is axially separated from a proximal edge delimiting the circumferential slot. Thereby, the proximal edge of the circumferential slot will not engage with the intermediate collar until the liquefaction process has already been initiated elsewhere. This facilitates obtaining axially separated melting regions.

According to an embodiment, the sleeve may comprise a proximal end liquefaction collar of thermoplastic material. The liquefaction collar may comprise a surface structure for increasing the friction between the liquefaction collar and the connector element and/or anchoring region, such as ridges extending axially along the outer face of the sleeve. The connector element may be insertable into the sleeve to a bonding start position in which the liquefaction collar is located on a proximal side of, and does not overlap with, the connector element as seen in a direction perpendicular to the insertion axis. Thereby, even if the connector element is entirely received in the mounting hole of the receiving object, the liquefaction collar may be held axially separated from the circumferential edge of the mounting hole in the initial phase of the bonding process. This means that the liquefaction collar will not engage with the receiving object and liquefy until a more distal portion of the sleeve has already liquefied.

According to an embodiment, a majority of the outer surface of the sleeve may be smooth, so as to avoid excessive friction and accidental liquefaction at other regions of the outer surface than those intended, such as at the liquefaction collar.

According to an embodiment, the sleeve may be at least 20% longer than the connector element, as seen along the insertion axis. Thereby, an axial pressure may be maintained on the sleeve while it liquefies and shrinks axially.

According to an embodiment, the connector element may be pre-mounted in the sleeve to form a friction-bondable connector assembly. Such an arrangement may render the machinery implementing the anchoring process simpler.

According to an embodiment, the connector element may be configured to engage with the sleeve in a bonding start position in an interlocking manner. Such an arrangement may render the machinery implementing the anchoring process simpler.

According to embodiments, the sleeve may, when interlocking with the connector element, extend beyond the connector element in the proximal direction by at least 20%, or at least 30%, of a total length of the sleeve.

According to an embodiment, the sleeve may comprise an expansion slot extending from an axial end into the sleeve, the expansion slot allowing the sleeve to be resiliently expanded in a radial direction. The slot reduces the risk that the sleeve is broken when pressed into interlocking engagement with the connector element, in particular when a hard and/or brittle material, such as a fiberglass-reinforced plastic, is used for the sleeve. According to an embodiment, the sleeve may comprise two or more expansion slots distributed about the circumference of the sleeve for additional flexibility.

According to an embodiment, the sleeve, as seen in a section perpendicular to the insertion axis, may be substantially circular with its centre axis coinciding with the insertion axis. Such a sleeve is particularly well suited for circular mounting holes. Similarly, the connector element may be circular as seen in said cross-section.

The connector element may have a female connector interface, which may have an internal thread for receiving a screw having a mating, outer thread.

According to an embodiment, the sleeve may comprise a proximal end collar extending radially inwards to, when enclosing the connector element, at least partly cover the connector element as seen along the insertion direction. Such a design may provide additional axial support to the connector element. Moreover, the proximal end collar may have the same colour as the outer surface of the receiving object adjacent to the hole, such that the connector element will blend into the surface of the receiving object.

According to yet another aspect of the invention, parts or all of the above-mentioned problems are solved, or at least mitigated, by a machine configured for carrying out the process according to any of the methods described hereinabove. The machine may be configured to perform the process using any of the connector element anchoring kits described hereinabove.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 1b is a perspective view of a section of the connector element of FIG. 1a, as seen along the arrows B-B of FIG. 1a;

FIG. 2b is a perspective view of a section of the sleeve of FIG. 2a, as seen along the arrows B-B of FIG. 2a;

FIG. 4b illustrates a section of the friction-bondable connector assembly of FIG. 4a, as seen along the arrows B-B of FIG. 4a;

DETAILED DESCRIPTION OF THE EXEMPLARY EMBODIMENTS

Woodwelding® technology has been proven to be highly advantageous for securely fixing inserts in a fibrous or porous structure. The general principle of Woodwelding® technology requires a thermoplastic material arranged somewhere in the insert/structure interface. By applying mechanical vibration, e.g. by means of an ultrasonic vibration device, to the thermoplastic material, friction forces will be generated causing heat generation and consequently melting of the thermoplastic material. The insert is pushed into a recess of the structure while the thermoplastic material is at least partly in liquid phase, whereafter the thermoplastic material is allowed to re-solidify as soon as the mechanical vibration is removed. Further examples of details of different Woodwelding® technology processes are described in, e.g., WO2015/181300.

Figure 1A:
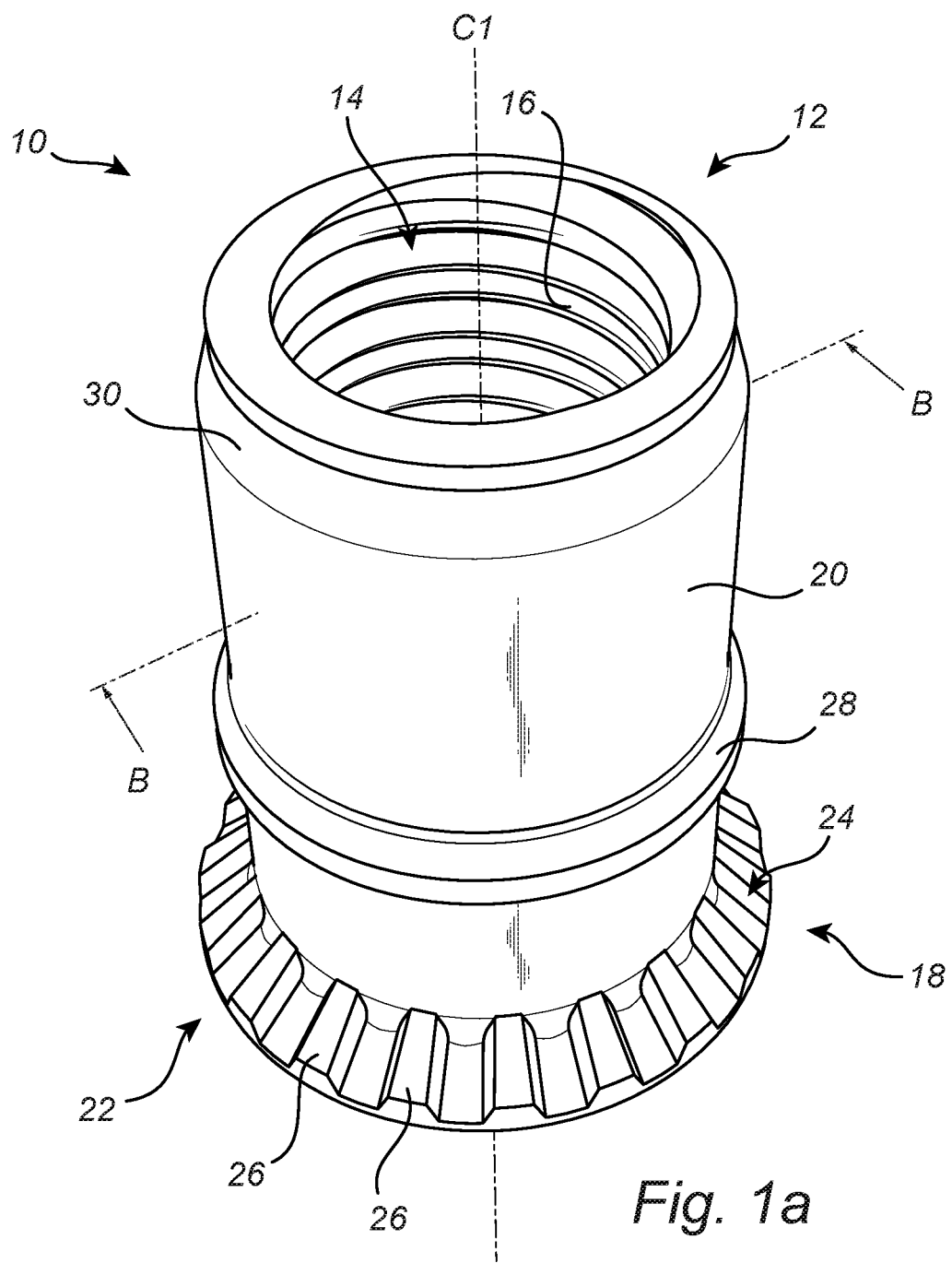
FIG. 1a is a diagrammatic view in perspective of a connector element according to a first embodiment.

FIG. 1a illustrates a connector element 10 for anchoring in a receiving object, such as a furniture part (not illustrated). The connector element 10 has a proximal end 12 provided with a connector interface 14, which in the illustrated embodiment is configured as a female connector interface and comprises an internal thread 16 for engaging with a screw (not shown) provided with a mating outer thread. The connector element 10 further has a distal end 18 for inserting into a mounting hole (not illustrated) of the receiving object. The connector element 10 has a generally circular cylindrical body 20, the circular cylindrical shape of which is coaxial with the circular cylindrical shape of the threaded female connector interface 14. At its distal end 18, the connector element 10 has a circumferential distal end collar 22 extending radially, with respect to a centre axis C1 of the circular cylindrical shape, from the body 20. The proximal face 24 of the distal end collar 22 slopes in the distal direction, and has a surface structure defined by a plurality of radial ridges 26. At an intermediate region between the proximal and distal ends 12, 18, the connector element 10 is provided with a circumferential, intermediate collar 28 extending radially, with respect to the centre axis C1, from the body 20. At the proximal end 12, the connector element 10 tapers to define a circumferential shoulder 30 sloping towards the distal direction.

Figure 1B:
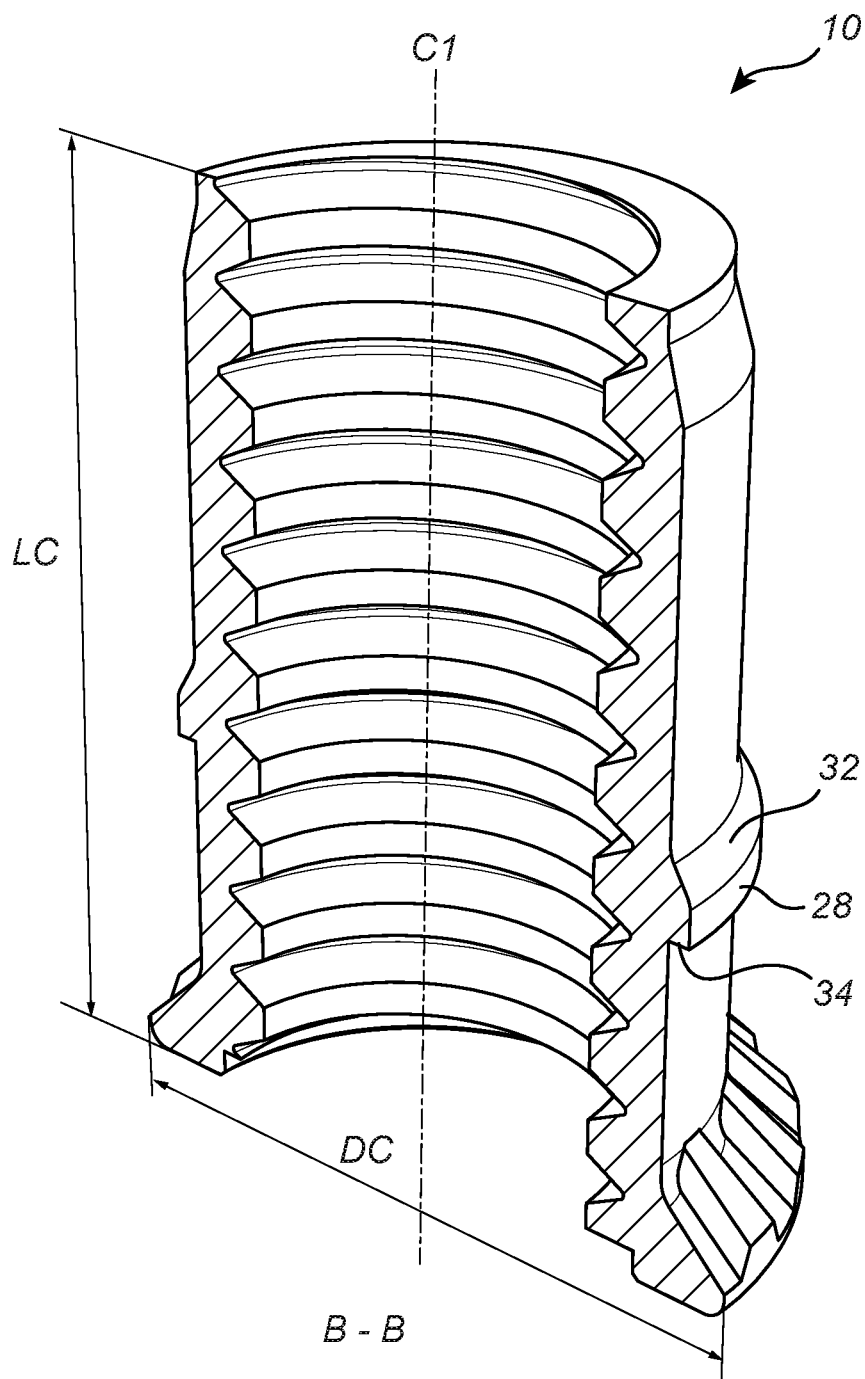

FIG. 1b illustrates the connector element 10 in section, as indicated by arrows B-B in FIG. 1a. As can be seen in FIG. 1b, the intermediate collar 28 has a proximal face 32 sloping in the distal direction, and a distal face 34 which lies in a plane substantially perpendicular to the centre axis C1. The connector element 10 has a total length LC, which may typically be between 5 mm and 40 mm. The connector element 10 also has a diameter, which varies along the length of the connector element 10, and reaches its largest value DC at the distal end collar.

Figure 2A:
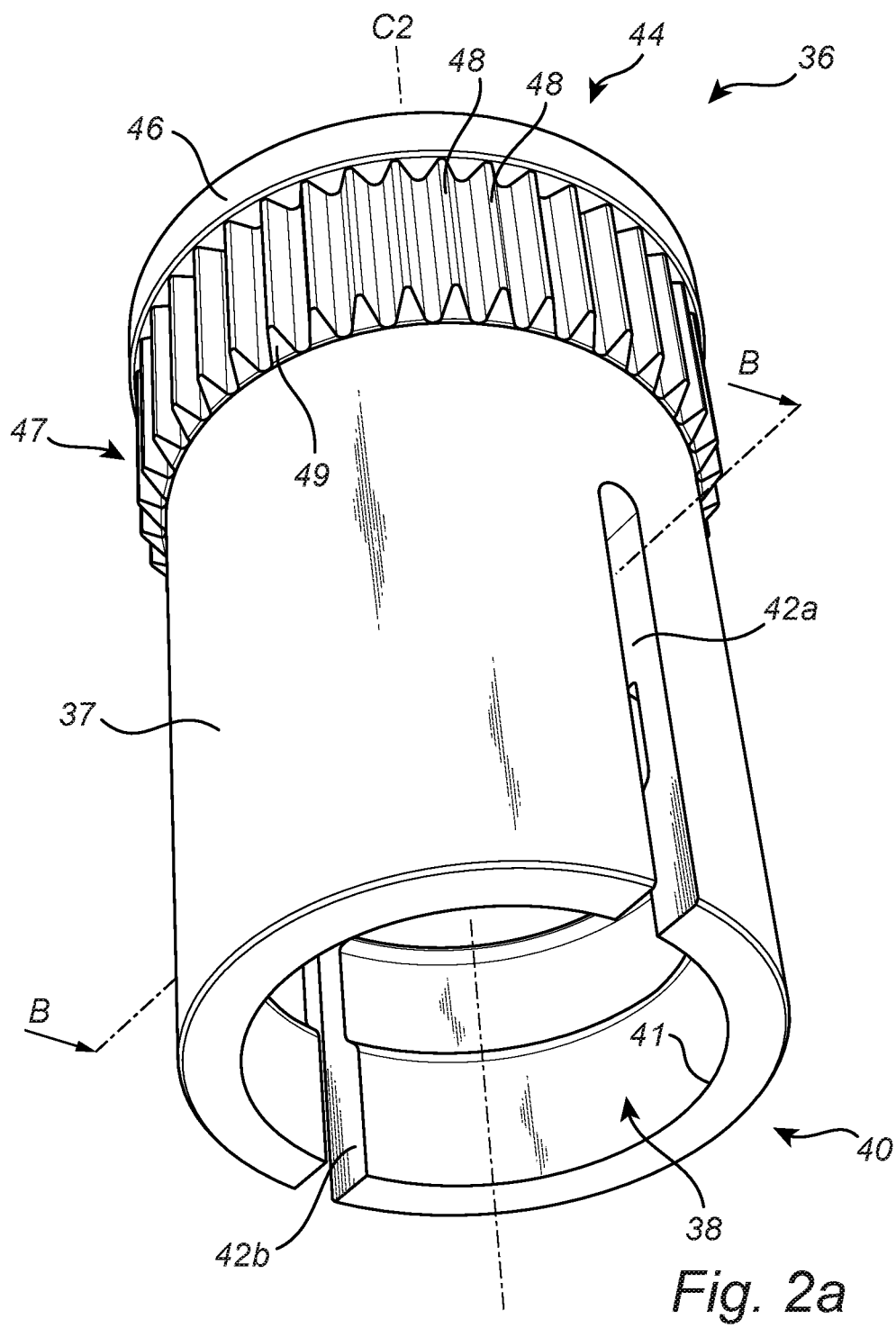
FIG. 2a is a diagrammatic view in perspective of a sleeve according to a first embodiment.

FIG. 2a illustrates a sleeve 36 made of a thermoplastic material. The sleeve 36 has a smooth, generally circular cylindrical outer face 37, and a circular cylindrical inner opening 38 configured to receive and enclose the connector element 10 in a manner that will be elucidated further below. The inner and outer circular cylindrical shapes 37, 38 of the sleeve 36 are coaxial with a centre axis C2 of the sleeve. At a distal end 40, the sleeve 36 is provided with a pair of expansion slots 42a-b extending from the distal end towards the proximal end 44 of the sleeve 36. An inner, distal edge of the sleeve 36 defines a distal liquefaction shoulder 41. At the proximal end 44, the sleeve 36 comprises a rim 46 extending radially, with respect to the centre axis C2, from the sleeve 36. A proximal end liquefaction collar 47 is defined by a plurality of friction ridges 48, which extend along the direction of the centre axis C2 and are distributed about the periphery of the outer face 37. Distal ends of the friction ridges 48 define a proximal liquefaction shoulder 49 facing in the distal direction.

Figure 2B:
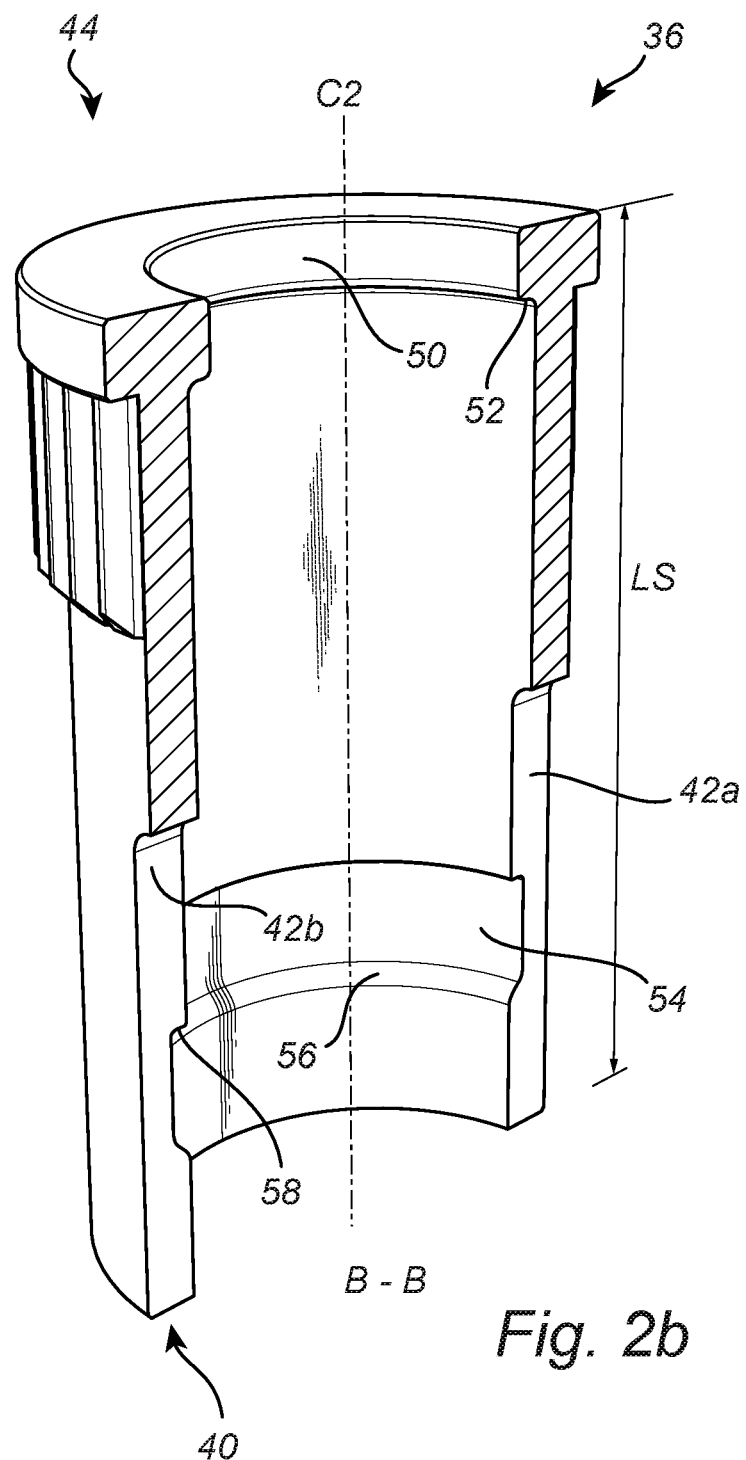

FIG. 2b illustrates the sleeve 36 in section, as indicated by arrows B-B in FIG. 2a. As can be seen in FIG. 2b, the proximal end 44 is provided with an inwards extending rim 50, which defines a proximal end inner shoulder 52 facing in the distal direction. At an intermediate region between the proximal and distal ends 44, 40, the sleeve 36 is provided with an inwards facing circumferential slot 54 for receiving the intermediate collar 28 of the connector element 10 (FIG. 1a). A distal edge 56 of the slot 54 slopes in the distal direction, whereas a proximal edge of the slot 54, defining an intermediate liquefaction shoulder 58, is substantially parallel to a plane perpendicular to the centre axis C2. The sleeve has a total length LS, which may, by way of example, typically be between 7 mm and 60 mm.

Figure 3A:
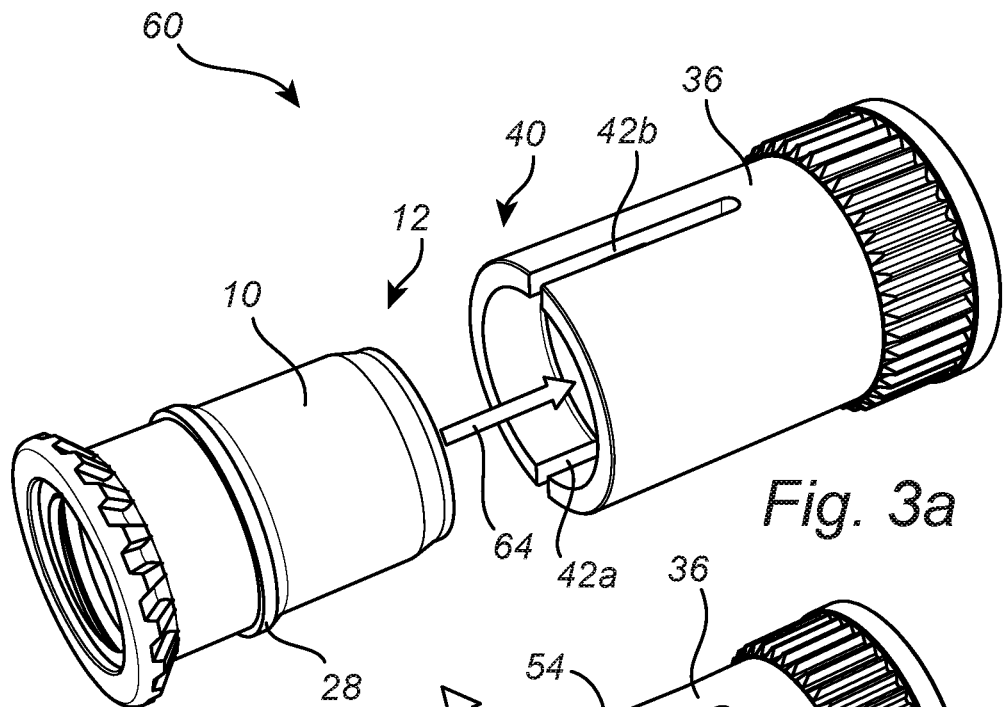
FIG. 3a is a schematic view in perspective of the connector element of FIG. 1a and the sleeve of FIG. 2a in a first position during an assembly process.
Figure 3B:
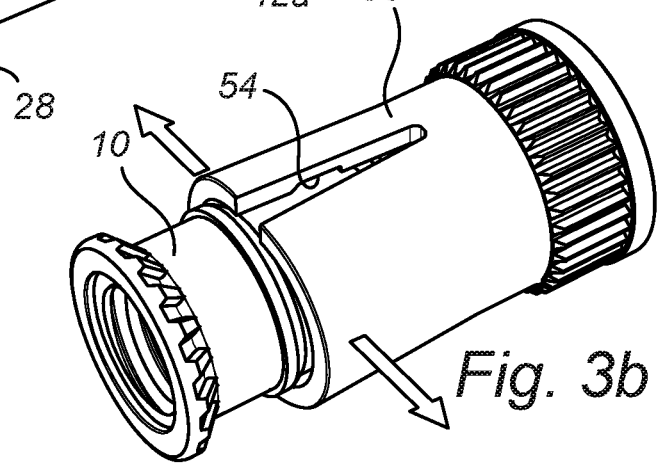
FIG. 3b is a schematic view in perspective of the connector element and sleeve of FIG. 3a in a second position during the assembly process.
Figure 3C:
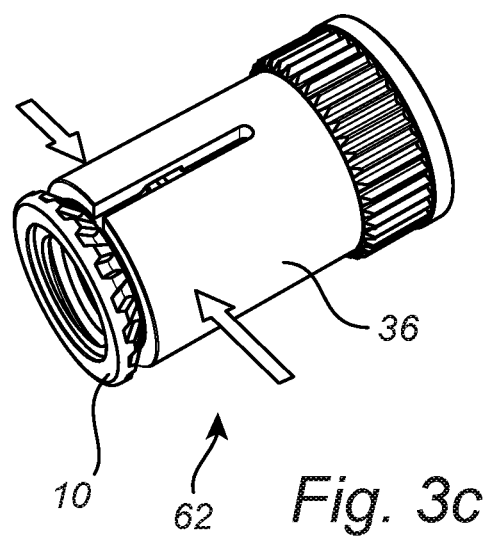
FIG. 3c is a schematic view in perspective of the connector element and sleeve of FIG. 3a in a third, final position during the assembly process, wherein the connector element and sleeve together define a friction-bondable connector assembly.
Figure 4A:
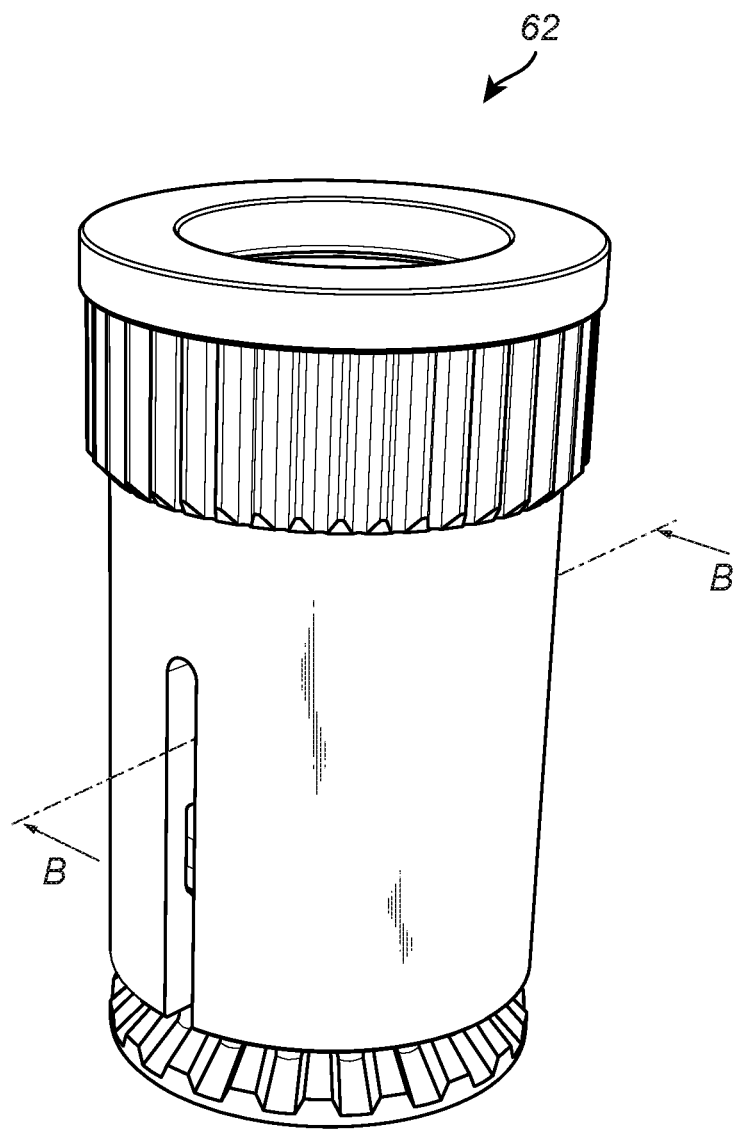
FIG. 4a is a diagrammatic view in perspective of the friction-bondable connector assembly of FIG. 3c.
Figure 4B:
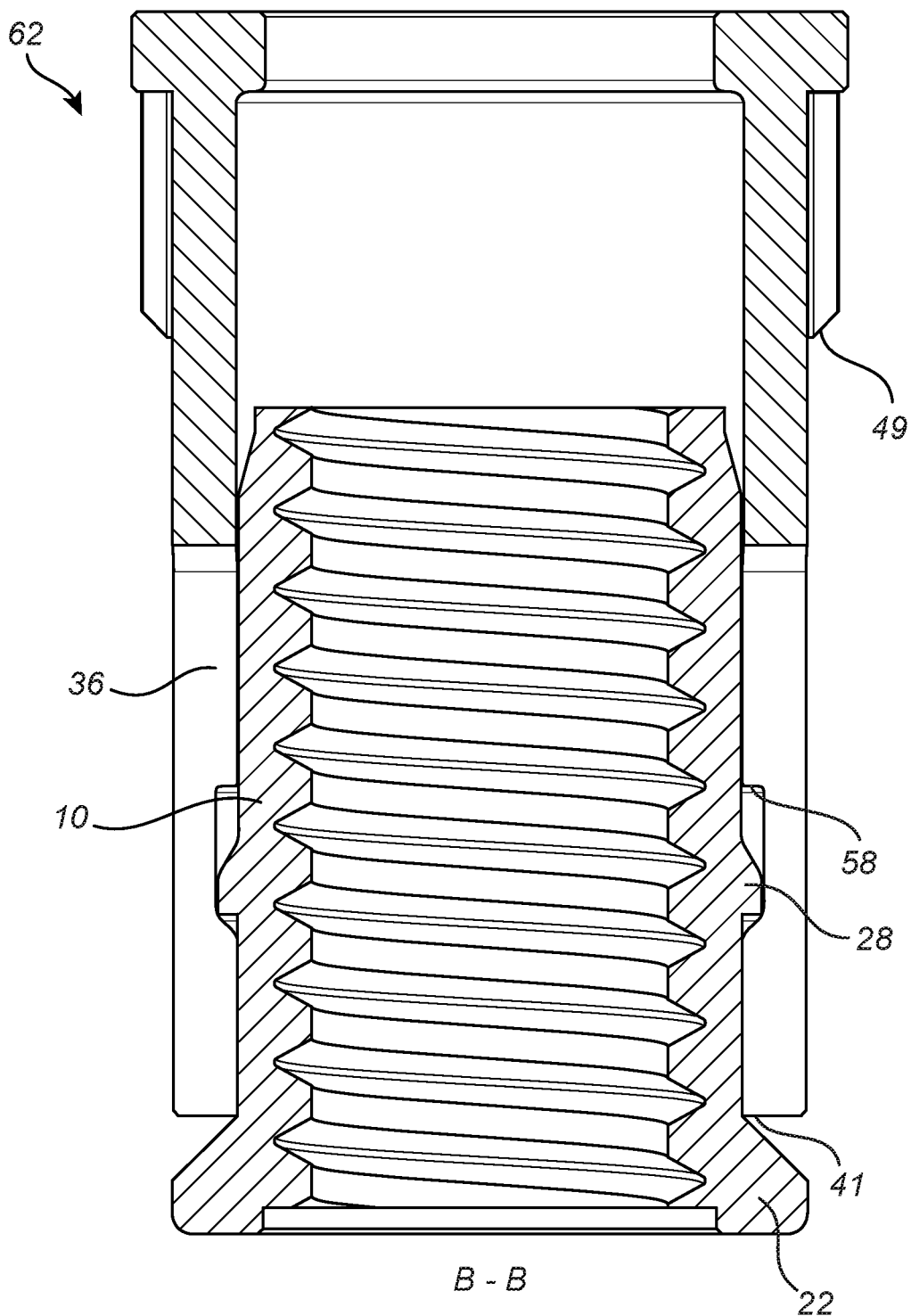

Together with the connector element 10 of FIGS. 1a-b, the sleeve 36 defines a connector element anchoring kit. FIGS. 3a-c illustrate the assembly of the connector anchoring kit 60 to form a friction-bondable connector assembly 62 (FIG. 3c). As illustrated in FIG. 3a, the proximal end 12 of the connector element 10 is pressed into the distal end 40 of the sleeve 36 along an assembly direction, illustrated by an arrow 64, which coincides with the centre axes C1, C2 (FIGS. 1a, 2a) of the connector element 10 and the sleeve 36. During insertion, the expansion slots 42a-b permit the distal end 40 of the sleeve 36 to resiliently expand, as illustrated by arrows in FIG. 3b, allowing the intermediate collar 28 of the connector element 10 to be pressed into the circumferential slot 54 of the sleeve 36. Once in the position of FIG. 3c, the distal end 40 of the sleeve 36 resiliently contracts, bringing the sleeve 36 and connector element 10 in interlocking engagement. FIG. 4a illustrates the friction-bondable connector assembly 62 in perspective, and FIG. 4b illustrates it in section, as indicated by arrows B-B in FIG. 4a. As can be seen in FIG. 4b, the distal liquefaction shoulder 41 engages with the distal end collar 22, whereas the intermediate liquefaction shoulder 58 is axially separated from the intermediate collar 28. The engagement between the distal face 34 (FIG. 1b) of the intermediate collar 28 and the distal edge 56 (FIG. 2b) of the slot 54 maintain the sleeve 36 and connector element 10 in interlocking engagement. Even though no gap is illustrated, the sleeve 36 encloses the connector element 10 with a radially loose fit along the entire axial length. As is apparent from FIG. 4b, the sleeve 36 is longer than the connector element 10, and extends beyond the connector element 10 in the proximal direction.

Figure 5A:
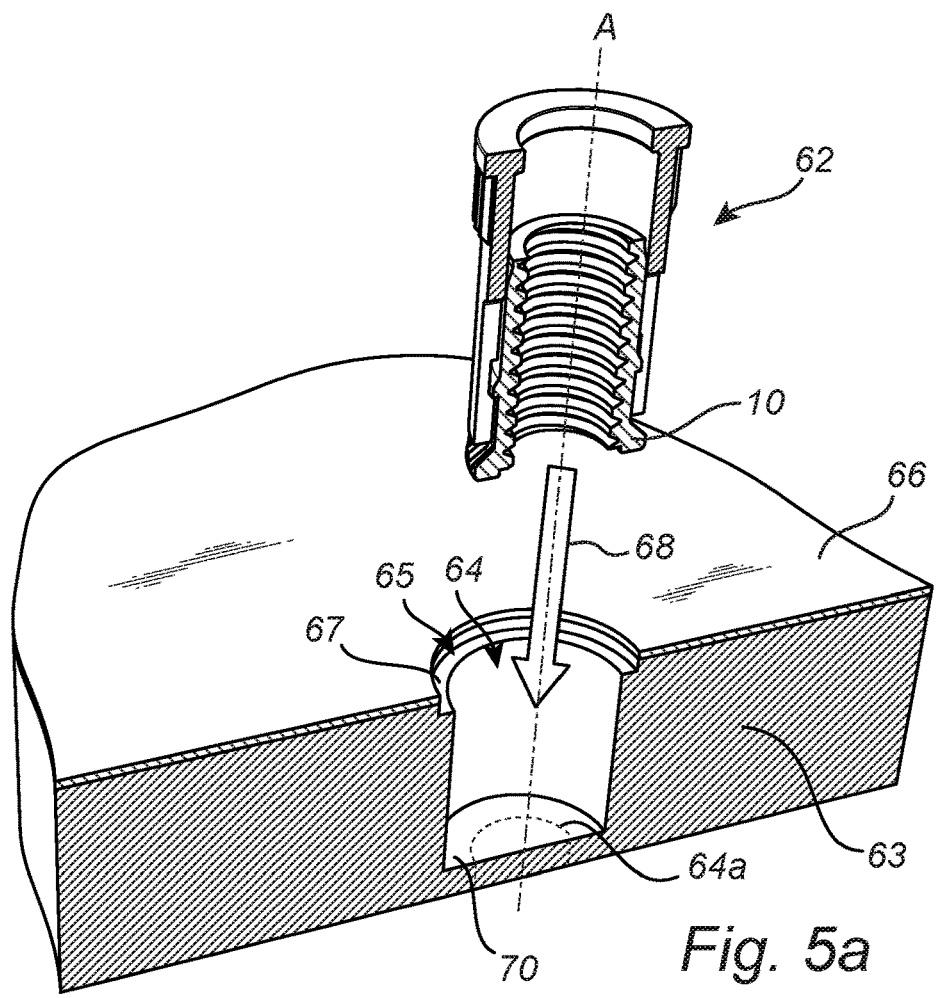
FIG. 5a is a schematic view in perspective of the friction-bondable connector assembly of FIG. 4b, still seen in section, in a first position during insertion into a mounting hole of a receiving object.
Figure 5B:
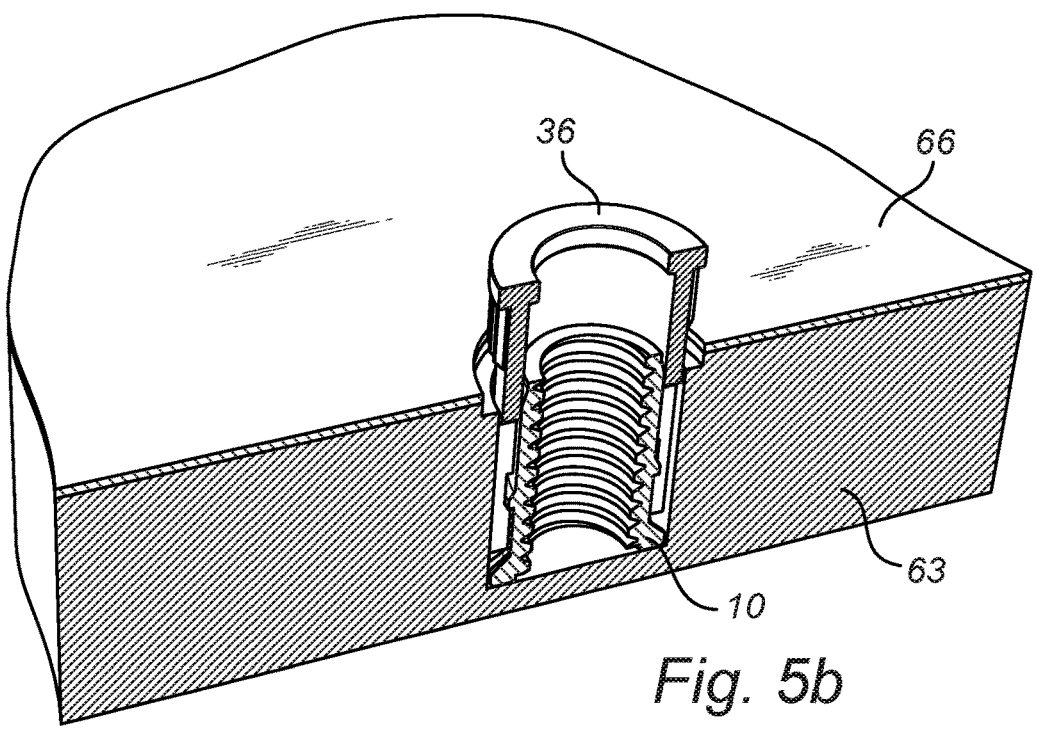
FIG. 5b is a schematic view in perspective of the friction-bondable connector assembly of FIG. 5a in a bonding start position in the mounting hole.

FIGS. 5a-b illustrate the insertion of the friction-bondable connector assembly 62 into a circular cylindrical mounting hole 64 of a receiving object 66. The mounting hole 64 is arranged in an anchoring region 63 of the receiving object 66, which anchoring region 63 consists of a material penetrable by liquefied thermoplastic, such as wood-chip board. The mounting hole 64 has an enlarged diameter portion 65 adjacent to the surface of the receiving object 66, which enlarged diameter portion 65 defines a countersunk anvil shoulder 67 in the mounting hole 64. The dual-diameter mounting hole 64 may be formed by a dual-diameter drill bit. The friction-bondable connector assembly 62 is inserted along an insertion axis A, which coincides with the centre axes C1, C2 (FIGS. 1a, 2a), in an insertion direction illustrated by an arrow 68. The friction-bondable connector assembly 62 is inserted with a radially loose fit into the mounting hole 64, i.e. without press-fit, and the insertion is finalized by the connector element 10 being brought into abutment with a bottom face 70 of the mounting hole 64. FIG. 5b illustrates the friction-bondable connector assembly 62 in a position ready to be bonded to the receiving object 66.

Figure 6A:
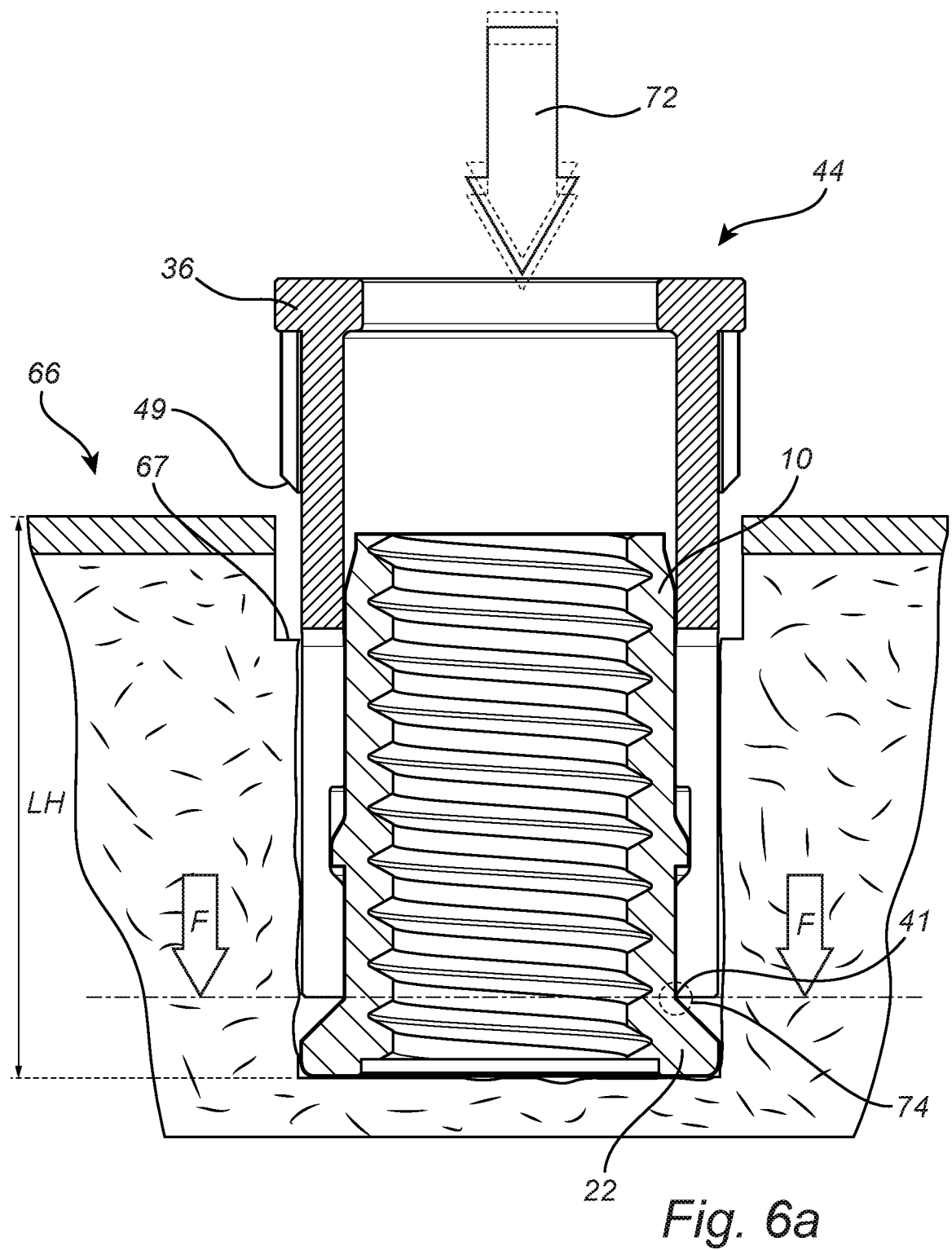
FIG. 6a is a schematic view in section of the friction-bondable connector assembly of FIG. 5b in a first position during a first bonding step.
Figure 6B:
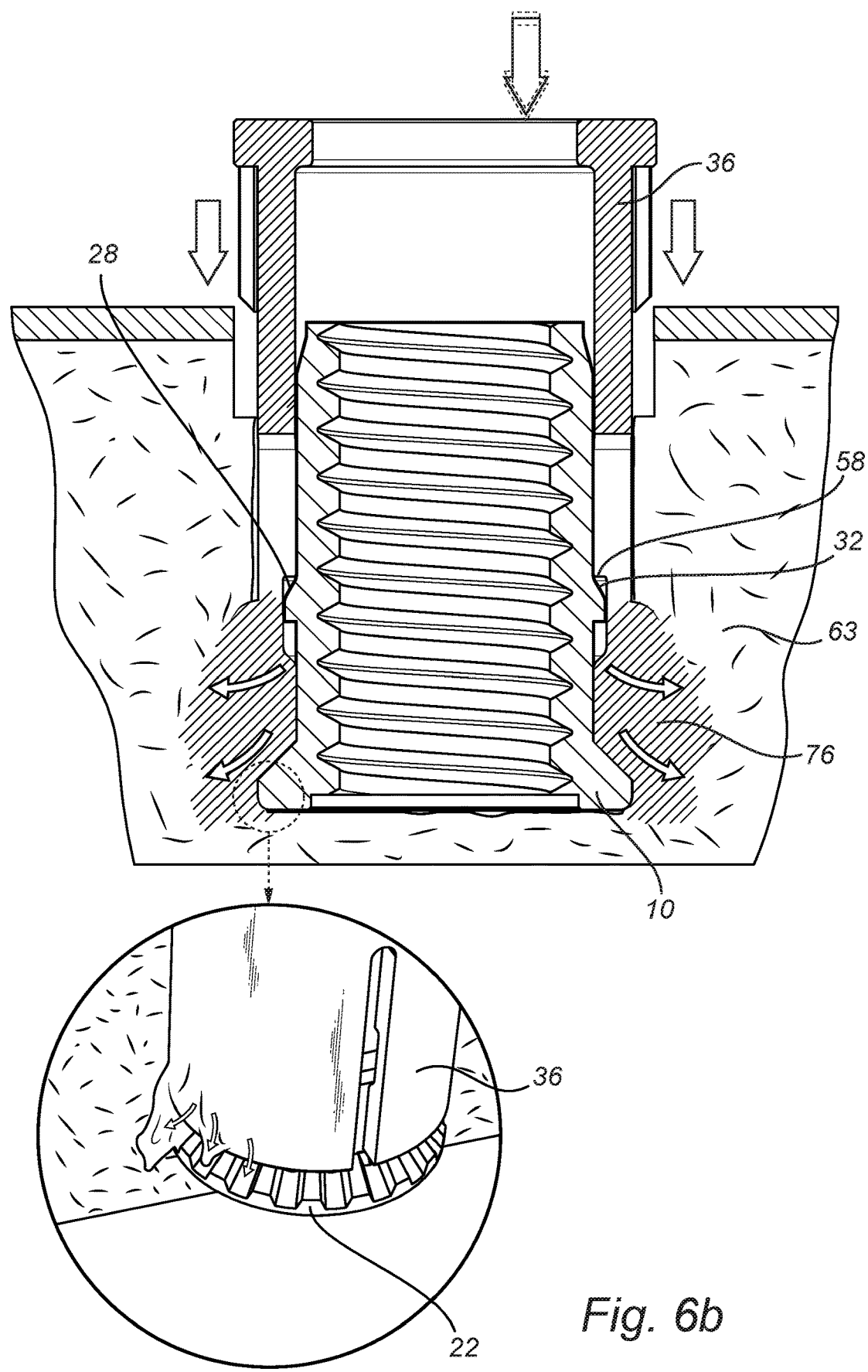
FIG. 6b is a schematic view in section of the friction-bondable connector assembly of FIG. 6a in a second position during the first bonding step.
Figure 6C:
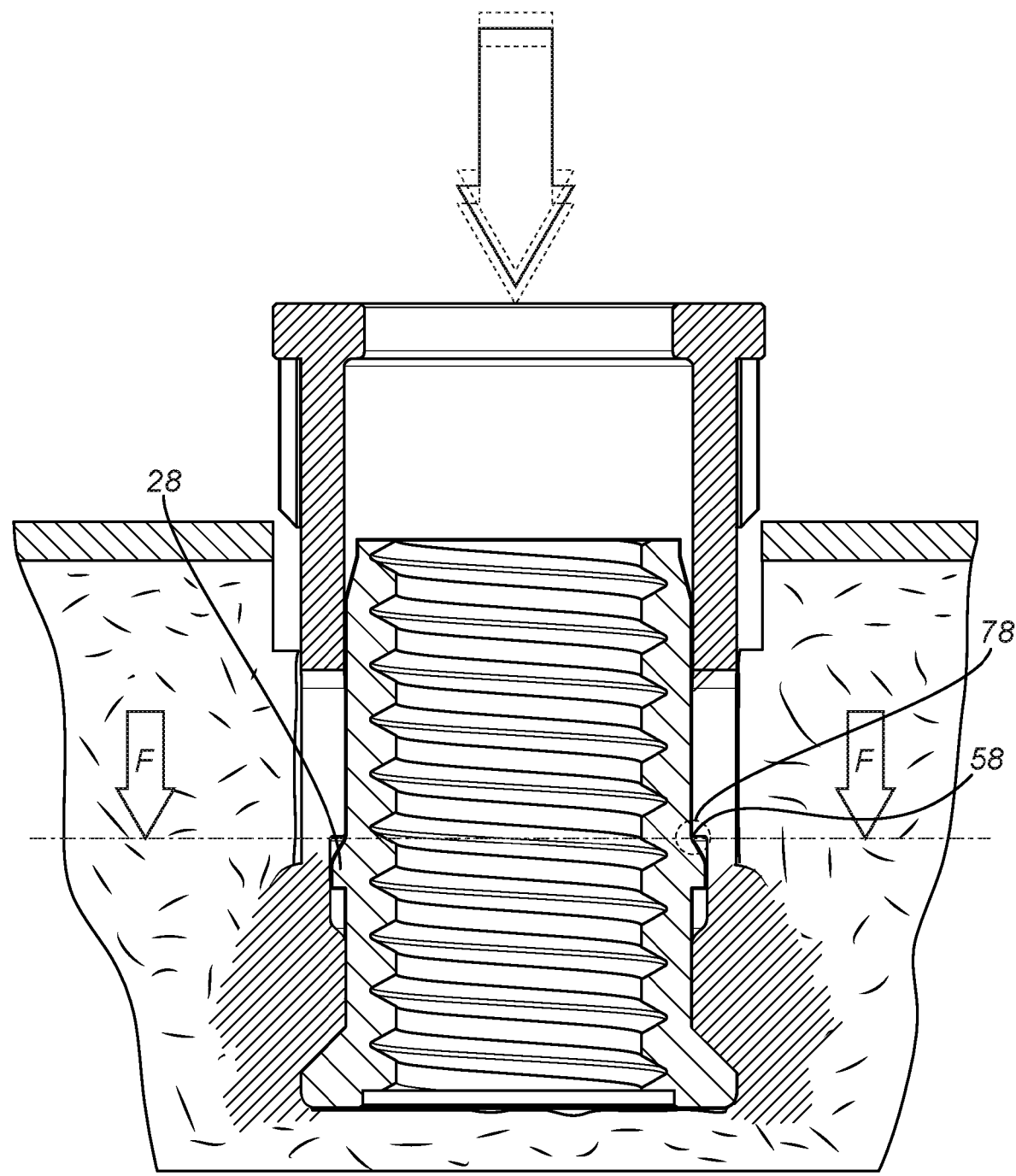
FIG. 6c is a schematic view in section of the friction-bondable connector assembly of FIG. 6b in a first position during a second bonding step.
Figure 6D:
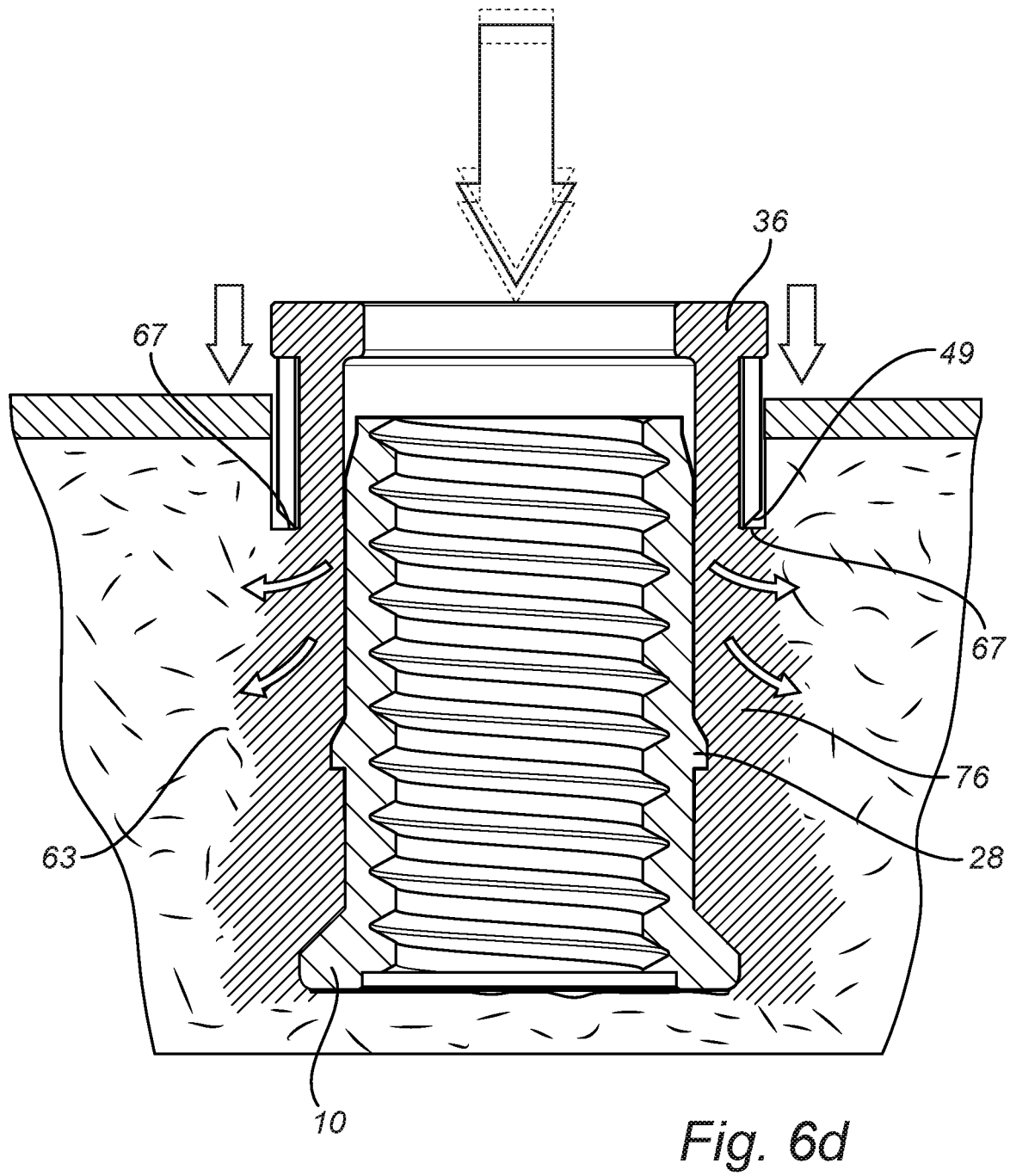
FIG. 6d is a schematic view in section of the friction-bondable connector assembly of FIG. 6b in a second position during the second bonding step.
Figure 6E:
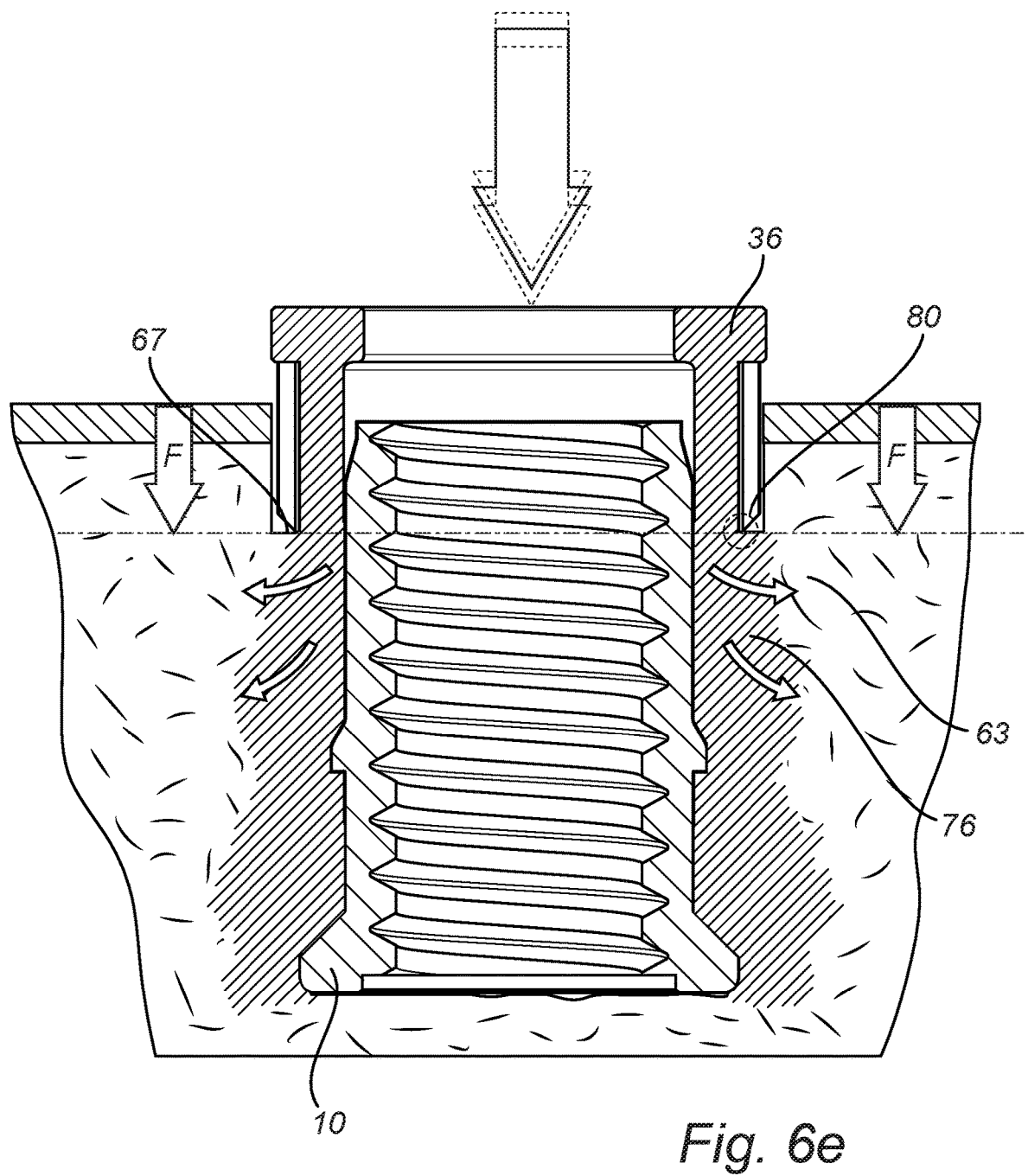
FIG. 6e is a schematic view in section of the friction-bondable connector assembly of FIG. 6d in a first position during a third bonding step.
Figure 6F:
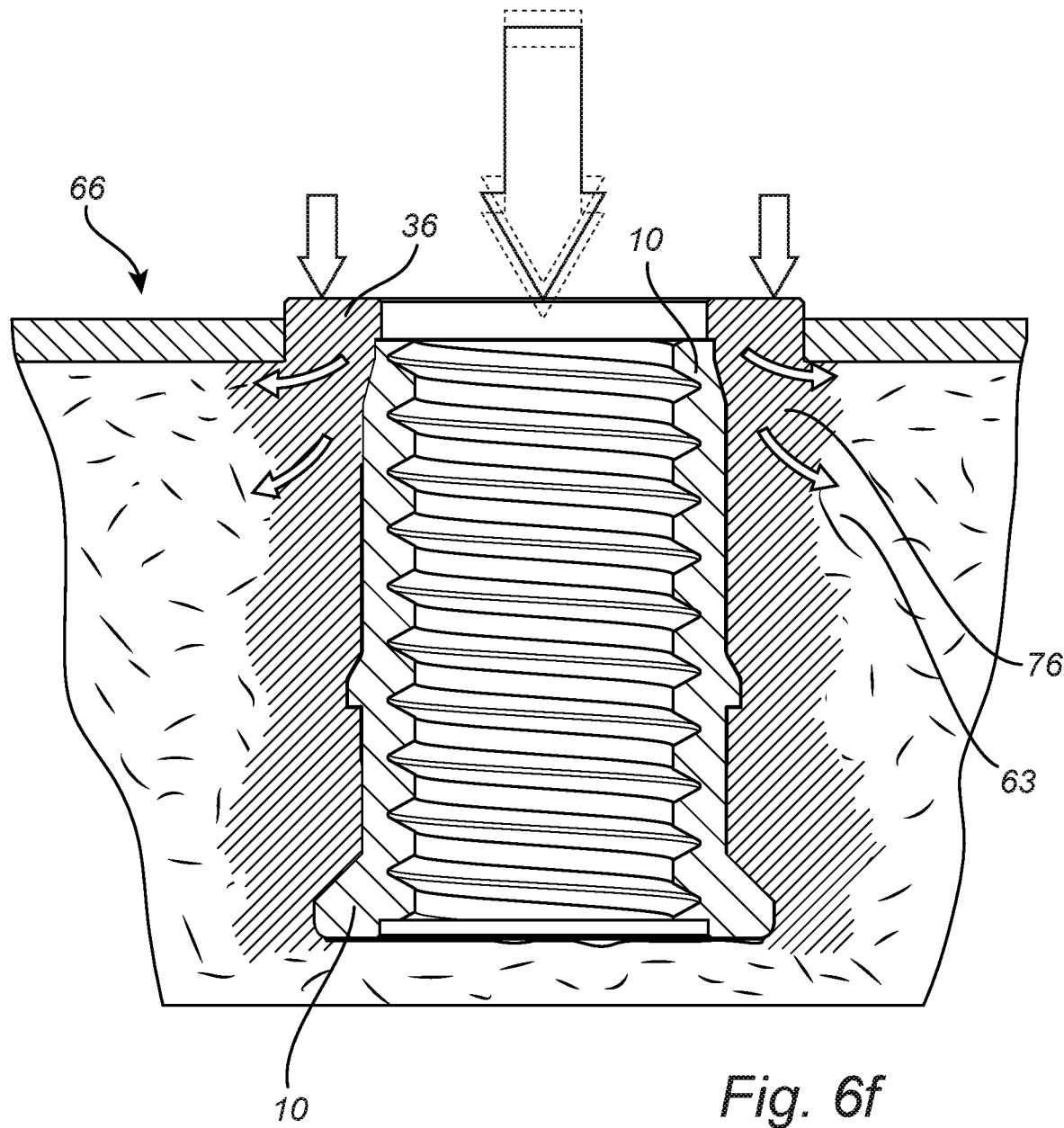
FIG. 6f is a schematic view in section of the friction-bondable connector assembly of FIG. 6e in a second position during the third bonding step.

FIG. 6a is a magnified view of the situation of FIG. 5b, and FIGS. 6a-f illustrate a bonding process for anchoring the connector element 10 in the receiving object 66. In the position of FIG. 6a, the proximal liquefaction shoulder 49 of the sleeve 36 is axially separated from the anvil shoulder 67 of the mounting hole 64 (FIG. 5a). During bonding, ultrasonic vibration energy is transferred to the sleeve by means of a sonotrode (not illustrated), which engages with the proximal end 44 of the sleeve 36. The sonotrode applies axial pressure in the direction of the arrow 72, and vibrates the sleeve 36 so as to generate friction heat at interfaces between the sleeve 36 and either or both of the connector element 10 and the receiving object 66. In each of FIGS. 6a, 6c, and 6e, the main level of engagement of the axial force exerted by the sleeve 36 on the connector element 10 or receiving object 66 is indicated by a line F.

In a first bonding step, illustrated in FIG. 6a, the sonotrode applies pressure in the direction of the arrow 72, thereby pressing the distal liquefaction shoulder 41 of the sleeve 36 against the distal end collar 22 of the connector element 10. The engagement between the distal liquefaction shoulder 41 and the distal end collar 22 defines a distal liquefaction initiation interface 74. Friction heat generated by the sonotrode's ultrasonic vibration at the distal liquefaction initiation interface 74 liquefies the thermoplastic material of the sleeve's distal end, bringing us to the situation illustrated in FIG. 6b. As the sonotrode continues to vibrate, and push the sleeve 36 along the insertion direction, liquefied thermoplastic 76 of the sleeve 36 is pressed into the penetrable material of the anchoring region 63 adjacent to the connector element's 10 distal end. The distal end collar 22 defines a comparatively liquid-tight bottom of the liquefied thermoplastic-filled gap between the connector element 10 and the inner wall of the mounting hole 64, and thereby guides liquefied thermoplastic 76 radially into the anchoring region 62. Liquefied thermoplastic also engages with the surface structure of the distal end collar 22, which is illustrated in perspective in the magnified detail view at the bottom of FIG. 6b, to later form a strong form-fitting engagement once the thermoplastic subsequently cools off and solidifies. Proximal and intermediate portions of the sleeve 36 remain solid, and act as a piston pressing liquefied thermoplastic 76 into the anchoring region 63. As the sleeve 36 moves along the insertion direction, the sleeve's 36 intermediate liquefaction shoulder 58 is brought into engagement with the intermediate collar's 28 proximal face 32, so as to form the intermediate liquefaction initiation interface 78 indicated in FIG. 6c.

In a second bonding step, the sonotrode presses the intermediate liquefaction shoulder 58 against the intermediate collar 28 of the connector element 10. Friction heat generated by the sonotrode's ultrasonic vibration at the intermediate liquefaction initiation interface 78 liquefies the thermoplastic of the sleeve's 36 intermediate portion, bringing us to the illustration in FIG. 6d. As the sonotrode continues to vibrate, and push the sleeve 36 along the insertion direction, liquefied thermoplastic 76 of the sleeve 36 continues to be pressed into the penetrable material of the anchoring region 63 adjacent to the intermediate collar 28 of the connector element 10. As the sleeve 36 moves along the insertion direction, the sleeve's 36 proximal liquefaction shoulder 49 is brought into engagement with the anvil shoulder 67 of the mounting hole, so as to form the proximal liquefaction initiation interface 80 indicated in FIG. 6e.

In a third bonding step, the sonotrode presses the proximal liquefaction shoulder 49 against the anvil shoulder 67 of the receiving object 66. Friction heat generated by the sonotrode's ultrasonic vibration at the proximal liquefaction initiation interface 80 liquefies the thermoplastic material of the sleeve's 36 proximal portion, and as the sonotrode continues to vibrate and push the sleeve 36 along the insertion direction, liquefied thermoplastic 76 of the sleeve 36 continues to be pressed into the penetrable material of the anchoring region 63 adjacent to the proximal end of the connector element 10. Once the position of FIG. 6f has been reached the pressure and vibration ceases, e.g. by de-energizing the sonotrode or disengaging it from the sleeve 36, and the thermoplastic 76 is allowed to re-solidify. The top of the sleeve 36 remains intact throughout the anchoring process and, in the final position of FIG. 6f, extends beyond the connector element 10 in the direction opposite to the insertion direction 68 (FIG. 5a). In the illustrated example, the connector element 10 has an axial length LC (FIG. 1b) shorter than the axial depth LH (FIG. 6a) of the mounting hole 64 (FIG. 5a), such that it will be slightly countersunk into the mounting hole 64 (FIG. 5a) when in the final position. Thereby, accidental contact between the sonotrode and the connector element 10 may be avoided, since the surface of the receiving object 66 may act as an end stop for the sonotrode. During bonding, the proximal end inner shoulder 52 (FIG. 2b) of the sleeve 36 may, as in the example illustrated in FIG. 6f, have been liquefied by the friction engagement with the circumferential shoulder 30 (FIG. 1a) of the connector element 10 to tightly embed the shoulder 30; alternatively, the anchoring process may be halted before the proximal end inner shoulder 52 reaches the circumferential shoulder 30 of the connector element 10. In the final position of FIG. 6f, the sleeve 36 protrudes above the surface of the receiving object 66. In a slight variation of the anchoring process, the third bonding step may instead continue until the proximal end 44 (FIG. 6a) of the sleeve 36 reaches a position where it is flush with the surface of the receiving object 66. In another variation, the third bonding step may continue until the proximal end 44 of the sleeve 36 reaches a position where it is countersunk into the receiving object 66.

Figure 7:
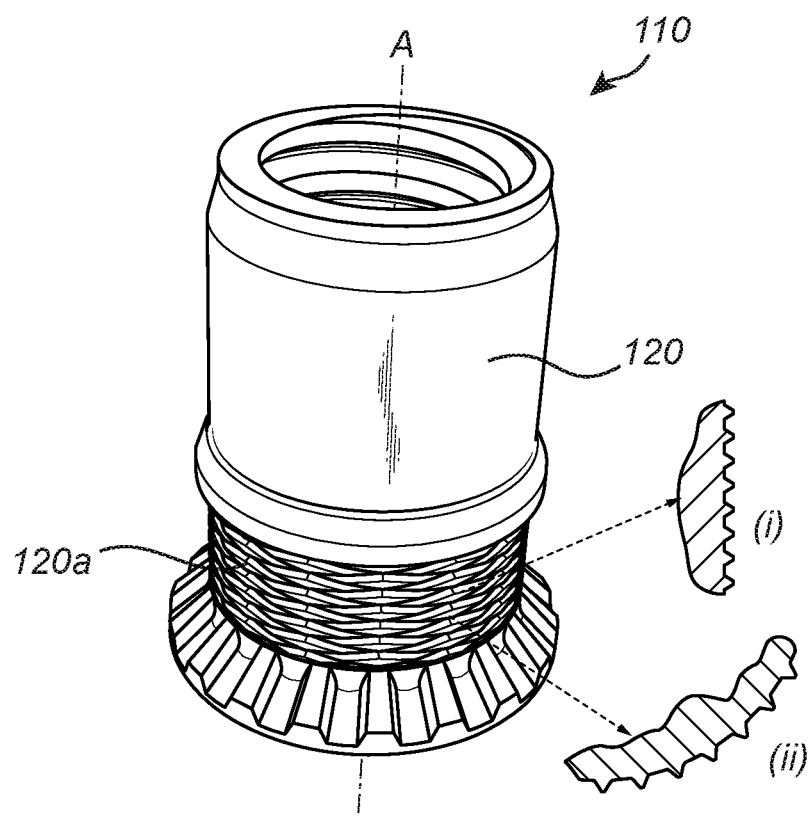
FIG. 7 is a diagrammatic view in perspective of a connector element according to a second embodiment.

The connector element 10 described hereinbefore has a body 20 (FIG. 1a) provided with a smooth outer surface. FIG. 7 illustrates a connector element 110 according to a second embodiment, which in every aspect is identical to the connector element of FIGS. 1a-b, except that the body 120 has a knurled surface portion 120a. As seen in a section (i) parallel to the insertion axis A, the knurled surface portion 120a defines a surface structure that varies in the axial direction, providing a high axial strength to the anchored connector element 110 once embedded in re-solidified thermoplastic in a mounting hole. Similarly, as seen in a section (ii) perpendicular to the insertion axis A, the knurled portion defines a surface structure that varies in the tangential direction, with respect to the insertion axis A, providing a high torsional strength to the anchored connector element 110 once embedded in re-solidified thermoplastic in a mounting hole.

Figure 8:
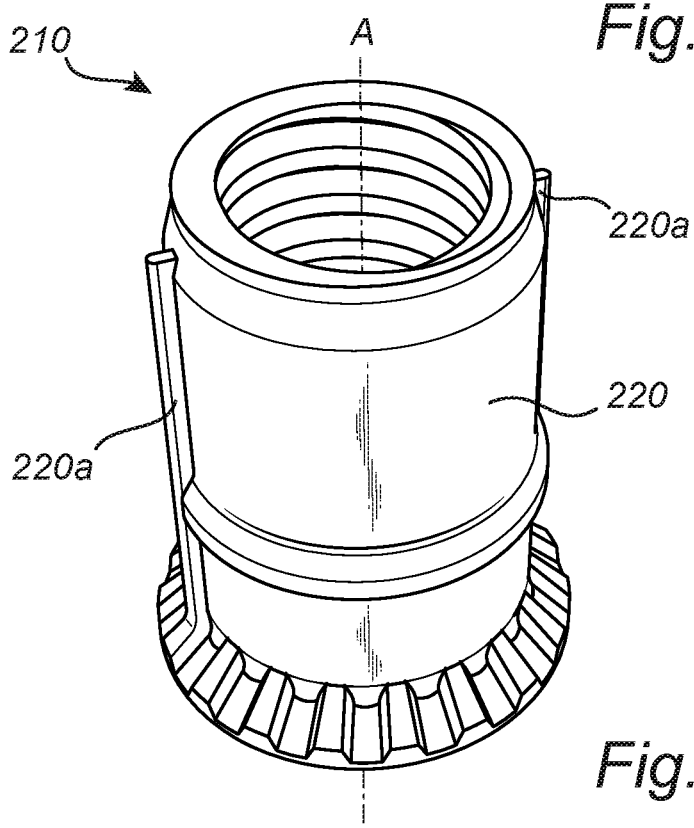
FIG. 8 is a diagrammatic view in perspective of a connector element according to a third embodiment.

FIG. 8 illustrates a connector element 210 according to a third embodiment, which in every aspect is identical to the connector element of FIGS. 1a-b, except that torsional support ridges 220a, protruding from the body 220 of the connector element 210, extend along the axial direction A. One or several such ridges 220a may be provided on connector elements intended for applications requiring elevated torsional strength.

Figure 9:
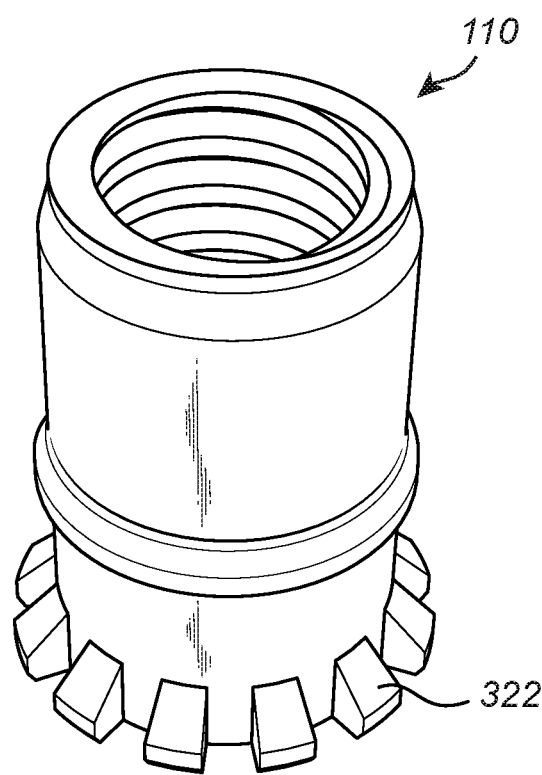
FIG. 9 is a diagrammatic view in perspective of a connector element according to a fourth embodiment.

FIG. 9 illustrates a connector element 310 according to a fourth embodiment, which in every aspect is identical to the connector element of FIGS. 1a-b, except that the distal end collar 322 is perforated to increase the flow of liquefied thermoplastic material to the distal side of the distal end collar 322. Such an arrangement may increase the volume of the anchoring region 63 (FIG. 5a) that is reachable by the liquefied thermoplastic, increasing the overall anchoring strength.

Figure 10:
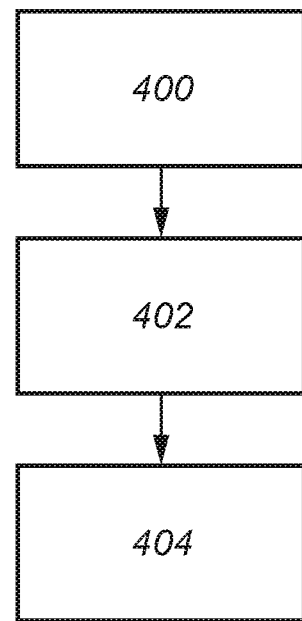
FIG. 10 is a flow chart illustrating a method of anchoring a connector element in a receiving object.

FIG. 10 is a flow chart illustrating the method lined out in the foregoing. In a step 400 (FIGS. 5a-b), the distal end of the connector element 10 is inserted into the mounting hole 64. In a step 402 (FIGS. 5a-b), the sleeve 36 is inserted into the mounting hole 64, the sleeve 36 enclosing the connector element 10. As has been illustrated in detail hereinbefore, steps 400 and 402 may be carried out simultaneously by pre-assembling the connector element 10 and the sleeve 36; alternatively, the connector element 10 and the sleeve may be inserted any consecutive order to a position in which the sleeve 36 encloses the connector element 10. Finally, in step 404 (FIGS. 6a-f), energy is transferred to liquefy at least a portion of the thermoplastic material of the sleeve 36. As has been illustrated in the foregoing, liquefaction may be initiated step-wise in a consecutive order at a plurality of axially separated liquefaction initiation interfaces 74, 78, 80. Additional liquefaction initiation interfaces may be provided along the axial length of the connector element 10 and sleeve 36, for example by providing additional pairs of intermediate collars 28 and circumferential slots 54 distributed along the length of the connector element 10 and sleeve 36.

Figure 11:
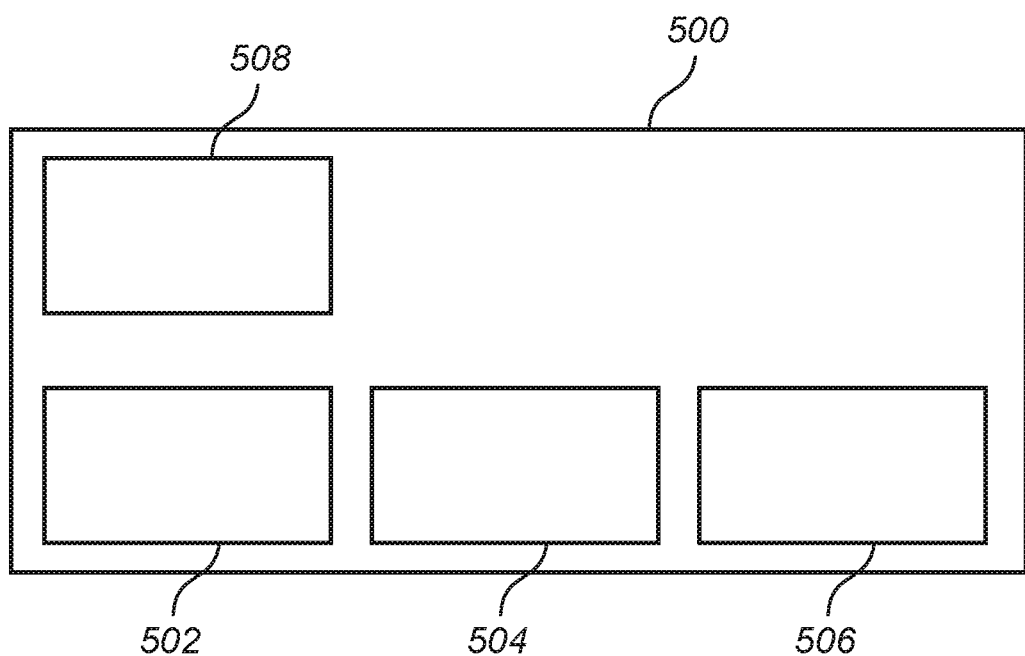
FIG. 11 is a schematic view of a machine according to an aspect.

A machine configured for carrying out the process described above is schematically shown in FIG. 11. The machine 500 may comprise a feeding unit 502 being configured to provide connector elements 10 and sleeves 36, as well as a positioning device 504 configured to receive a connector element 10 and a sleeve 36 from the feeding unit 502 and to place the connector element 10 and the sleeve 36 (FIGS. 1a, 2a) in a mounting hole 64 (FIG. 5a) of a receiving object 66. The machine 500 may also comprise an energy transfer device 506, such as a heater or sonotrode, for transferring energy to the sleeve 36. The machine 500 may also be equipped with a magazine 508 comprising a plurality of sleeves 36 and connector elements 10, either as separate components or as friction-bondable connector assemblies 62, for automated, repeated anchoring operations on a feed of receiving objects 66 moving through the machine 500.

Examples of penetrable materials particularly suitable for the anchoring region 63 described hereinabove are solid materials such as wood, plywood, chipboard, cardboard, concrete brick material, porous glass, foams of metal, ceramic, or polymer materials, or sintered ceramic, glass or metal materials, wherein such materials comprise spaces into which the thermoplastic material can penetrate which spaces are originally filled with air or with another displaceable or compressible material. Further examples are composite materials which have the above stated properties or materials with surfaces comprising a suitable roughness, suitable machined surface structures or suitable surface coatings (e.g. consisting of particles). If the penetrable material has thermoplastic properties it is desirable that it maintains its mechanical strength during the anchoring step either by further comprising a mechanically stable phase or by having a considerably higher melting temperature than the thermoplastic material to be liquefied in the anchoring step. The penetrable material is preferably solid at least at ambient temperature, wherein "solid" in the context of the present disclosure is to mean that this material is rigid, substantially not elastically flexible (no elastomer characteristics) and not plastically deformable and it is not or only very little elastically compressible. It further comprises (actual or potential) spaces into which the liquefied material can flow or be pressed for the anchoring. It is e.g. fibrous or porous or comprises penetrable surface structures which are e.g. manufactured by suitable machining or by coating (actual spaces for penetration). Alternatively, the penetrable material is capable of developing such spaces under the hydrostatic pressure of the liquefied thermoplastic material, which means that it may not be penetrable or only to a very small degree when under ambient conditions. This property (having potential spaces for penetration) implies e.g. inhomogeneity in terms of mechanical resistance. An example of a material that has this property is a porous material whose pores are filled with a material which can be forced out of the pores, a composite of a soft material and a hard material or a heterogeneous material (such as wood) in which the interfacial adhesion between the constituents is smaller than the force exerted by the penetrating liquefied material. Thus, in general, the penetrable material comprises an inhomogeneity in terms of structure ("empty" spaces such as pores, cavities etc.) or in terms of material composition (displaceable material or separable materials). For the sake of completeness, however, it is pointed out that the invention is not limited to applications in penetrable materials; it may also be used for anchoring connector elements in receiving objects of materials that are not penetrable according to the above definition. The mounting hole 64 may optionally be provided with undercuts. Undercuts may also be created during the process, e.g. by pressing the sleeve into the material of the receiving object so as to crack it, or by compressing e.g. the honey combs of a honeycomb board.

The connector element 10 is made of a relatively non-thermoplastic material. An exemplary, suitable material for the connector element is metal, such as steel, aluminium, zinc alloy such as Zamak 5, or pot metal. However, the term relatively non-thermoplastic should be construed in the context of the anchoring process; in order to anchor a connector element 10 using the process, the body 20 of the connector element 10 needs to remain solid throughout the anchoring process. Hence, the term "relatively non-thermoplastic" should be construed to include also any thermoplastic materials having a melting point substantially higher than that of the sleeve 36, since such materials will not have thermoplastic properties in the context of the invention.

A thermoplastic material suitable for the sleeve 36 described hereinabove may comprises a polymeric phase (especially C, P, S or Si chain based) that transforms from solid into liquid or flowable above a critical temperature range, for example by melting, and retransforms into a solid material when again cooled below the critical temperature range, for example by crystallization, whereby the viscosity of the solid phase is several orders of magnitude, such as at least three orders of magnitude, higher than that of the liquid phase. The thermoplastic material may generally comprise a polymeric component that is not cross-linked covalently or that is cross-linked in a manner that the cross-linking bonds open reversibly upon heating to or above a melting temperature range. The polymer material may further comprise a filler, e.g. fibres or particles of a material which has no thermoplastic properties or has thermoplastic properties including a melting temperature range which is considerably higher than the melting temperature range of the basic polymer. Examples for the thermoplastic material are thermoplastic polymers, co-polymers or filled polymers, wherein the basic polymer or co-polymer is e.g. polyethylene, polypropylene, polyamides (in particular polyamide 12, polyamide 11, polyamide 6, or polyamide 66), polyoxymethylene, polycarbonate-urethane, polycarbonates or polyester carbonates, acrylonitrile butadiene styrene (ABS), acrylonitrile-styrene-acrylate (ASA), styrene-acrylonitrile, polyvinyl chloride, polystyrene, or polyether ether ketone (PEEK), polyetherimide (PEI), polysulfone (PSU), poly(p-phenylene sulphide) (PPS), liquid crystal polymers (LCP) etc.

Mechanical vibration or oscillation suitable for the method according to the invention may typically have a frequency between 2 and 200 kHz; more typically between 10 and 100 kHz; and even more typically between 15 and 40 kHz. It may, by way of example, provide a typical vibration power of 0.2 to 20 W per square millimetre of active surface. The vibrating tool (e.g. sonotrode) may be designed such that its interface with the sleeve oscillates predominantly in the direction of the insertion axis A (FIG. 5a), and with an amplitude of between 1 and 100 μm, such as around 30 to 60 μm.

The invention has mainly been described above with reference to a few embodiments. However, as is readily appreciated by a person skilled in the art, other embodiments than the ones disclosed above are equally possible within the scope of the invention as defined by the appended patent claims. For example, the mounting hole 64 (FIG. 5a) is illustrated as a blind hole. However, it may alternatively be configured as a through-hole, extending all the way through e.g. furniture part made of wood-chip board. The inner face of the through-hole 64 may be provided with an end-stop shoulder, for example by forming a smaller-diameter through-hole 64a through the bottom 70 of the mounting hole 64. Thereby, the inner thread 14 (FIG. 1a) of the connector element 10 may be accessed from either side of the board. Moreover, the sleeve 36 (FIG. 2a) has been illustrated as having an axial through-hole 38 for receiving the connector element 10. However, this is not necessary—it may suffice that the sleeve is open at only one end. By way of example, the sleeve 36 may be closed by an axial end wall at the proximal end. Such a sleeve may be used for anchoring a hidden connector element that may be later accessed, by e.g. removing the axial end wall to expose the thread, for installing optional components of e.g. a re-configurable furniture system. In the foregoing, all components have been illustrated to have a substantially circular cylindrical or rotation-symmetric geometry about the insertion axis A (FIG. 5a) and centre axes C1, C2 (FIGS. 1a, 2a). However, even though such geometry may be preferred for circular mounting holes 64, and circular mounting holes may be easier to form by e.g. drilling, a circular geometry is not necessary. Moreover, the connector element, the sleeve and the mounting hole do not need to have the same general shape, or mating shapes. In the foregoing, the first and second connector interfaces are described as screw interfaces. However, this is not necessary. The invention is also suitable for anchoring other types of connector interfaces, such as bayonet interfaces, click connections, magnets, clips, etc. The connector element to be anchored in the receiving object need not be provided with a female connector interface; alternatively, it may be a male connector interface, such as a threaded pin.

The invention claimed is:

1. A method of anchoring a connector element in a receiving object, the receiving object having an anchoring region provided with a mounting hole for receiving the connector element made of a relatively non-thermoplastic material, and the connector element having a distal end and a proximal end, the proximal end being provided with a first connector interface for engaging with a mating second connector interface, the method comprising:

inserting the distal end of the connector element into the mounting hole in an insertion direction along an insertion axis (A);

inserting a sleeve comprising a thermoplastic material into the mounting hole, the sleeve enclosing and being unbonded to the connector element; and transferring energy to liquefy at least a portion of the thermoplastic material of the sleeve.

2. The method according to claim 1, wherein the sleeve and the connector element are pre-assembled and inserted into said mounting hole simultaneously.

3. The method according to claim 1, wherein the energy is transferred by means of mechanical energy transfer.

4. The method according to claim 1, wherein the liquefaction of the thermoplastic material is initiated at a liquefaction initiation interface between the sleeve and the connector element.

5. The method according to claim 4, wherein said liquefaction initiation interface is located at a distal end of the sleeve.

6. The method according to claim 1, wherein the energy is transferred to sequentially liquefy a plurality of axially separate portions of the thermoplastic material of the sleeve.

7. The method according to claim 1, wherein the distal end of the connector element is moved into an axial end position, in which it abuts an axial support face of the mounting hole, prior to liquefying said at least a portion of the thermoplastic material.

8. The method according to claim 1, wherein the anchoring region comprises a solid material which is penetrable by the thermoplastic material of the sleeve when liquefied, the method further comprising allowing at least a portion of the liquefied thermoplastic material to penetrate into the penetrable material.

9. The method according to claim 1, further comprising allowing at least a portion of the liquefied thermoplastic material to axially enclose a structure extending radially from a body of the connector element, and thereafter allowing the liquefied thermoplastic material to solidify to provide axial support between the connector element and the anchoring region.

10. The method according to claim 1, further comprising allowing at least a portion of the liquefied thermoplastic material to enclose a tangentially varying surface structure of the connector element, and thereafter allowing the liquefied thermoplastic material to solidify to provide rotation resistance to the engagement between the connector element and the anchoring region.

11. The method according to claim 1, wherein the receiving object is a furniture part, or a blank for forming a furniture part.

12. The method according to claim 1, wherein the first connector interface is a female connector interface for engaging with a male connector interface.

13. The method according to claim 1, further comprising moving a proximal end of the sleeve in the insertion direction while said at least a portion of the sleeve is liquefied.

14. The method according to claim 1, wherein the connector element is inserted into the mounting hole to a position in which it is flush with, or countersunk into, an outer surface of the receiving object, and/or the sleeve is moved to a position in which a proximal end of the sleeve is flush with, or countersunk into, said outer surface of the receiving object.

15. A machine configured for carrying out the process according to claim 1.

16. The method according to claim 3, wherein the means of mechanical energy transfer comprises mechanical vibration.

* * * * *